(12) United States Patent
Okada et al.

(10) Patent No.: US 7,436,464 B2
(45) Date of Patent: Oct. 14, 2008

(54) ACTIVE-MATRIX SUBSTRATE AND DISPLAY DEVICE INCLUDING THE SUBSTRATE WHEREIN A BOTTOM-GATE TFT HAS DATA LINES FORMED BELOW THE GATE LINES

(75) Inventors: Yoshihiro Okada, Kyoto (JP); Wataru Nakamura, Nara (JP); Kenji Nakamura, Chiryu (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 11/214,764

(22) Filed: Aug. 31, 2005

(65) Prior Publication Data

US 2006/0044487 A1 Mar. 2, 2006

(30) Foreign Application Priority Data

Sep. 1, 2004 (JP) ............... 2004-254876

(51) Int. Cl.
*G02F 1/136* (2006.01)
(52) U.S. Cl. .......................... 349/46; 349/43
(58) Field of Classification Search .................. 349/44, 349/111, 148–152
See application file for complete search history.

(56) References Cited

U.S. PATENT DOCUMENTS

| 5,380,555 | A | 1/1995 | Mine et al. |
| 5,645,901 | A * | 7/1997 | Fukuchi et al. ............... 428/1.4 |
| 5,879,959 | A * | 3/1999 | Chen ........................... 438/30 |
| 6,633,360 | B2 * | 10/2003 | Okada et al. ................. 349/145 |
| 6,674,495 | B1 * | 1/2004 | Hong et al. ................... 349/43 |
| 6,704,085 | B2 | 3/2004 | Nishimura et al. |
| 7,095,460 | B2 | 8/2006 | Choi et al. |
| 2002/0180901 | A1 * | 12/2002 | Kim .............................. 349/43 |
| 2004/0018669 | A1 * | 1/2004 | Song ........................... 438/151 |

FOREIGN PATENT DOCUMENTS

| JP | 05-061069 A | 3/1993 |
| JP | 10-102003 A | 4/1998 |
| JP | 2001-098224 A | 4/2001 |
| JP | 2003-315815 A | 11/2003 |

OTHER PUBLICATIONS

Choi et al., Advanced Display Research Center, IDW, 2003, pp. 617-620.

* cited by examiner

*Primary Examiner*—Andrew Schechter
*Assistant Examiner*—Matthew Tynan
(74) *Attorney, Agent, or Firm*—Birch, Stewart, Kolasch & Birch, LLP

(57) ABSTRACT

An active-matrix substrate includes: a base substrate; source lines; gate lines; thin-film transistors; and pixel electrodes. Each transistor is a bottom-gate thin-film transistor. The source lines are arranged under the gate lines with a first interlayer insulating film interposed and are electrically connected to the respective source electrodes of their associated thin-film transistors through contact holes cut through the first interlayer insulating film.

20 Claims, 16 Drawing Sheets

ACTIVE-MATRIX SUBSTRATE AND DISPLAY DEVICE INCLUDING THE SUBSTRATE WHEREIN A BOTTOM-GATE TFT HAS DATA LINES FORMED BELOW THE GATE LINES

BACKGROUND OF THE INVENTION

1. Field of the Invention

The present invention relates to an active-matrix substrate for use in liquid crystal TVs, liquid crystal monitors, notebook PCs and so on. The present invention also relates to a display device including such an active-matrix substrate.

2. Description of the Related Art

A liquid crystal display (LCD) is a display device with significantly reduced thickness and power dissipation, and has found a broad variety of applications in various fields. Among other things, an active-matrix-addressed LCD, including a switching element such as a thin-film transistor (TFT) for each pixel, has such high contrast ratio, excellent response characteristic and high performance as to be applied to TVs, monitors, notebook PCs, and so on. And the LCD market has been expanding faster and faster year after year.

On an active-matrix substrate for use to make such an active-matrix-addressed LCD, provided are a plurality of gate lines, a plurality of source lines that cross the gate lines with an insulating film interposed between them, and thin-film transistors, each of which is arranged near the intersection between its associated pair of gate and source lines for the purpose of switching its associated pixel.

The capacitance produced in each gate line-source line intersection (which is usually called a "parasitic capacitance") may cause some deterioration in display quality. That is why such a parasitic capacitance preferably has as small a capacitance value as possible.

For that purpose, Japanese Patent Application Laid-Open Publication No. 5-61069 discloses a technique of reducing the parasitic capacitance to be produced in each gate line-source line intersection by decreasing the widths of the gate lines and source lines in those intersections and thereby decreasing the area of the intersections.

However, if the line widths were decreased albeit locally, then the resistance of those lines would increase to possibly produce rounded signal waveforms. Also, if the line widths were decreased, then the chances of line snapping would increase. For that reason, the decreased line width usually needs be at least about 50% of the original width. That is why the parasitic capacitance in the intersections cannot be reduced beyond a certain limit according to the technique disclosed in Japanese Patent Application Laid-Open Publication No. 5-61069. However, the sizes and definitions of LCDs in high demand have been on a steep rise recently. In those big and high-definition LCDs, the line widths are broadened to reduce the wiring resistance, and the lines cross each other in an increased number of intersections. As a result, increased parasitic capacitance is produced in those intersections. Consequently, the rounding of the signal waveforms becomes even more significant.

Another technique of reducing the capacitance to be produced in the gate line-source line intersection may be to thicken the insulating film that covers the gate lines. However, if a portion of the insulating film that covers the gate line function as a gate insulating film as in a bottom-gate TFT, the thickened insulating film would decrease the drivability of the TFT.

SUMMARY OF THE INVENTION

In order to overcome the problems described above, an object of the present invention is to provide an active-matrix substrate that can reduce the capacitance produced in the intersections between the gate lines and source lines without increasing the wiring resistance or decreasing the drivability of switching elements, and also provide a display device including such an active-matrix substrate.

An active-matrix substrate according to a preferred embodiment of the present invention preferably includes: a base substrate; a plurality of source lines provided on the base substrate; a plurality of gate lines, which are arranged so as to cross the source lines; a plurality of thin-film transistors, which have been formed on the base substrate and each of which operates in response to a signal that has been supplied to an associated one of the gate lines; and a plurality of pixel electrodes, each of which is electrically connectible to an associated one of the source lines by way of an associated one of the thin-film transistors. Each said thin-film transistor is a bottom-gate thin-film transistor, which includes a gate electrode that is electrically connected to an associated one of the gate lines, a gate insulating film that coats the gate electrode, a semiconductor layer that is provided over the gate electrode with the gate insulating film interposed, and source/drain electrodes that have been formed on the semiconductor layer. The source lines are arranged under the gate lines with a first interlayer insulating film interposed and are electrically connected to the respective source electrodes of their associated thin-film transistors through contact holes that have been cut through the first interlayer insulating film.

In one preferred embodiment of the present invention, the active-matrix substrate preferably further includes: a first conductive member, which has been formed by patterning the same conductive film as the gate lines; and a second conductive member, which has been formed by patterning the same conductive film as the pixel electrodes. Each of the source lines is preferably electrically connected to the source electrodes through the first and second conductive members.

In this particular preferred embodiment, the first conductive member is preferably in contact with the source line in the contact holes that have been cut through the first interlayer insulating film.

In a specific preferred embodiment, the active-matrix substrate preferably further includes a second interlayer insulating film, which is provided so as to cover the thin-film transistors. The second conductive member is preferably in contact with the first conductive member in contact holes that have been cut through the second interlayer insulating film.

More particularly, the second conductive member is preferably in contact with the source electrodes of the thin-film transistors in the contact holes that have been cut through the second interlayer insulating film.

In another preferred embodiment, the first interlayer insulating film preferably has a greater thickness and a lower dielectric constant than the gate insulating film.

In still another preferred embodiment, the first interlayer insulating film preferably has a thickness of 1.0 μm to 4.0 μm.

In yet another preferred embodiment, the first interlayer insulating film preferably has a dielectric constant of 4.0 or less.

In yet another preferred embodiment, the first interlayer insulating film is preferably made of an insulator including an organic ingredient.

In a specific preferred embodiment, the first interlayer insulating film may be made of a spin-on-glass (SOG) material, of which the skeleton is an Si—O—C bond.

In an alternative preferred embodiment, the first interlayer insulating film may be made of a spin-on-glass (SOG) material, of which the skeleton is an Si—C bond.

In another alternative preferred embodiment, the first interlayer insulating film may be made of a spin-on-glass (SOG) material including a filler made of silica.

In yet another preferred embodiment, the semiconductor layer is preferably made of amorphous silicon.

In yet another preferred embodiment, the active-matrix substrate preferably includes a plurality of pixel regions, which are arranged in matrix and in each of which an associated one of the pixel electrodes is provided.

In that case, the active-matrix substrate preferably includes: a display area, which is defined by the pixel regions; and a non-display area, which is located around the display area and in which a plurality of terminals are provided to receive signals for driving the pixel regions. The first interlayer insulating film is preferably substantially non-existent in the non-display area.

In yet another preferred embodiment, the active-matrix substrate may further include a shield electrode, which is provided so as to extend substantially parallel to the source lines.

In this particular preferred embodiment, the shield electrode is preferably electrically connected to an associated one of the gate lines.

In an alternative preferred embodiment, the active-matrix substrate preferably further includes a plurality of storage capacitor lines, which are arranged on the base substrate, and the shield electrode is preferably electrically connected to an associated one of the storage capacitor lines.

In yet another preferred embodiment, the shield electrode is preferably arranged so as to overlap with the edge of an associated one of the pixel electrodes.

A display device according to a preferred embodiment of the present invention preferably includes: an active-matrix substrate according to any of the preferred embodiments of the present invention described above; and a display medium layer arranged on the active-matrix substrate, whereby the objects mentioned above are achieved.

In one preferred embodiment of the present invention, the display device preferably further includes a counter substrate, which faces the active-matrix substrate through the display medium layer, and the display medium layer is preferably a liquid crystal layer.

According to a preferred embodiment of the present invention, source lines are provided under gate lines with a first interlayer insulating film interposed between them and are electrically connected to the source electrodes of thin-film transistors through contact holes that have been cut through the first interlayer insulating film. Thus, in an active-matrix substrate including thin-film transistors of a bottom-gate type, the capacitance produced in the intersections between the gate lines and source lines can be reduced without increasing the wiring resistance or decreasing the drivability of the thin-film transistors.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 4A through 4I are cross-sectional views schematically illustrating respective process steps for fabricating the TFT substrate 100a.

FIGS. 7A through 7H are cross-sectional views schematically illustrating respective process steps for fabricating the TFT substrate 200a.

FIG. 8 is a plan view schematically illustrating the TFT substrate 200a.

DETAILED DESCRIPTION OF PREFERRED EMBODIMENTS

Hereinafter, preferred embodiments of the present invention will be described with reference to the accompanying drawings. It should be noted that the present invention is in no way limited to the following specific preferred embodiments.

Embodiment 1

Figure 1:
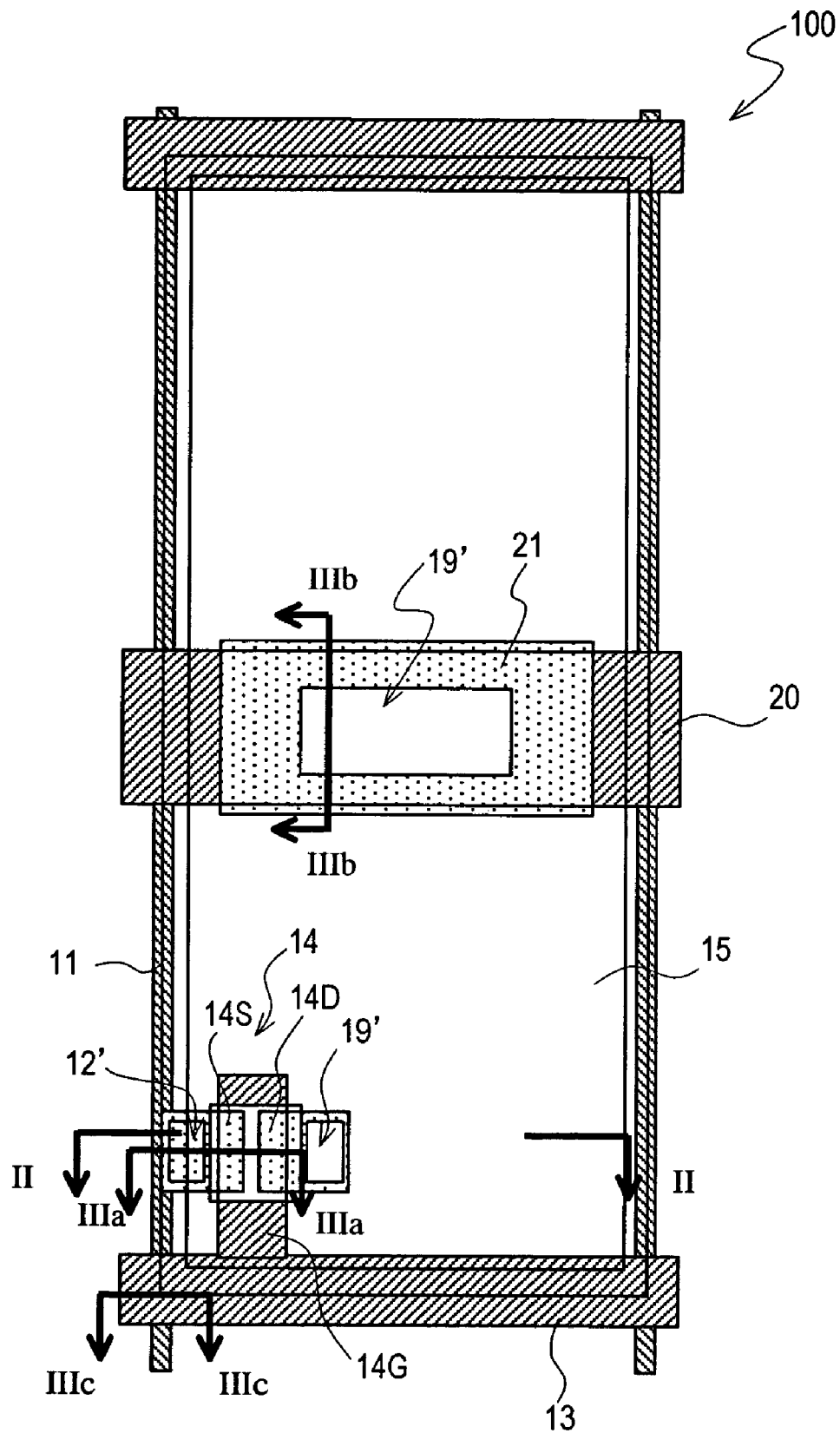
FIG. 1 is a plan view schematically illustrating an LCD 100 according to a first specific preferred embodiment of the present invention.
Figure 2:
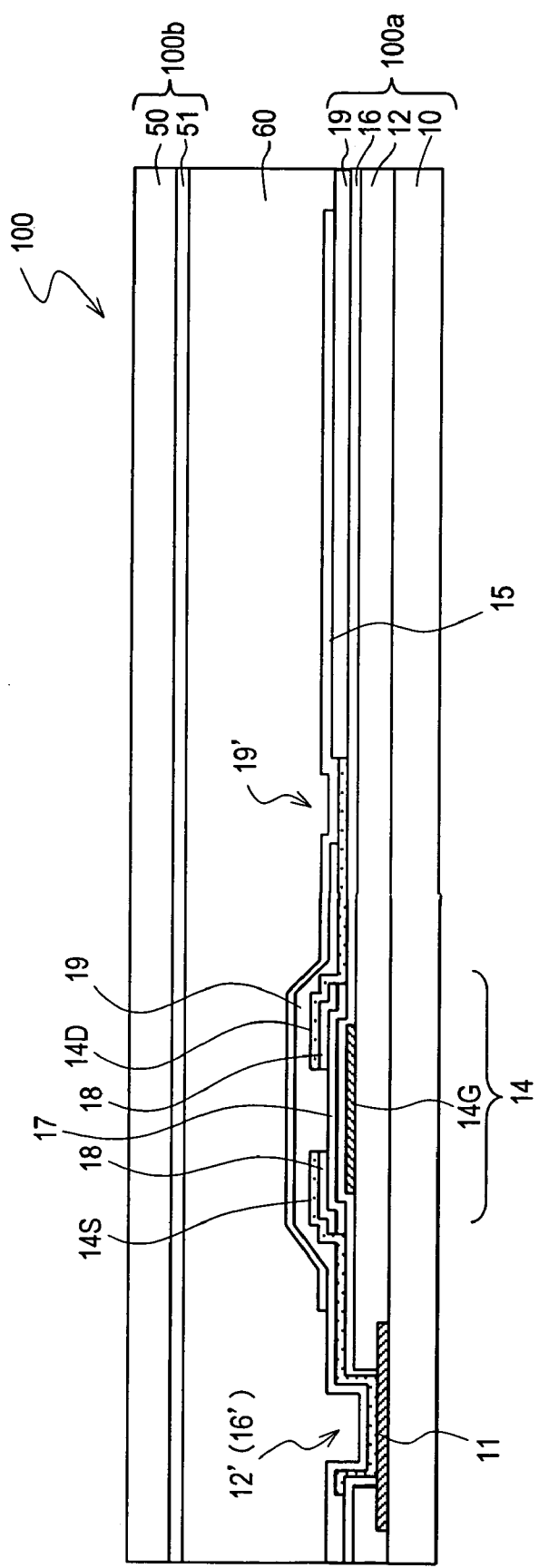
FIG. 2 is a cross-sectional view of the LCD 100 as viewed on the plane II-II shown in FIG. 1.

FIGS. 1 and 2 illustrate an LCD 100 according to a first specific preferred embodiment of the present invention. FIG. 1 is a plan view schematically illustrating one pixel region of the LCD 100. FIG. 2 is a cross-sectional view of the LCD 100 as viewed on the plane II-II shown in FIG. 1.

The LCD 100 includes an active-matrix substrate 100a (which will be referred to herein as a "TFT substrate 100a"), a counter substrate 100b (which will be sometimes referred to herein as a "color filter substrate 100b") that faces the TFT substrate 100a, and a liquid crystal layer 60 interposed between the two substrates 100a and 100b.

The TFT substrate 100a preferably includes a transparent insulating substrate (e.g., a glass substrate) 10, a plurality of source lines 11 arranged on the substrate 10, a first interlayer insulating film 12 provided so as to cover the source lines 11, and a plurality of gate lines 13, which are provided on the first interlayer insulating film 12 so as to cross the source lines 11.

In each pixel region of the TFT substrate 100a, provided are a thin-film transistor (TFT) 14, which operates in response to a signal supplied to its associated gate line 13, and a pixel electrode 15, which is electrically connectible to its associated source line 11 by way of the TFT 14.

The counter substrate 100b preferably includes a transparent insulating substrate (e.g., a glass substrate) 50 and a counter electrode 51, which has been formed on the substrate 50 so as to face the pixel electrodes 15. Typically, the counter substrate 100b further includes color filters.

The liquid crystal layer 60 preferably changes its orientation states in response to the voltage applied between the pixel electrodes 15 and the counter electrode 51 and modulates the light passing through itself, thereby conducting a display operation. The liquid crystal layer 60 may be of any of various display modes. For example, a twisted nematic (TN) mode liquid crystal layer that utilizes its optical rotatory property or an electrically controlled birefringence (ECB) mode liquid crystal layer that utilizes its birefringence property may be used. Among a number of ECB modes, vertically aligned (VA) mode contributes to achieving a high contrast ratio. A VA mode liquid crystal layer is typically obtained by sandwiching a liquid crystal layer, including a liquid crystal material with negative dielectric anisotropy, between two vertical alignment layers.

Hereinafter, the configuration of the TFT substrate 100a will be described more fully with reference to FIGS. 3A, 3B and 3C, too, which are cross-sectional views of the TFT substrate 100a as respectively viewed on the planes IIIa-IIIa, IIIb-IIIb and IIIc-IIIc shown in FIG. 1.

Figure 3A:
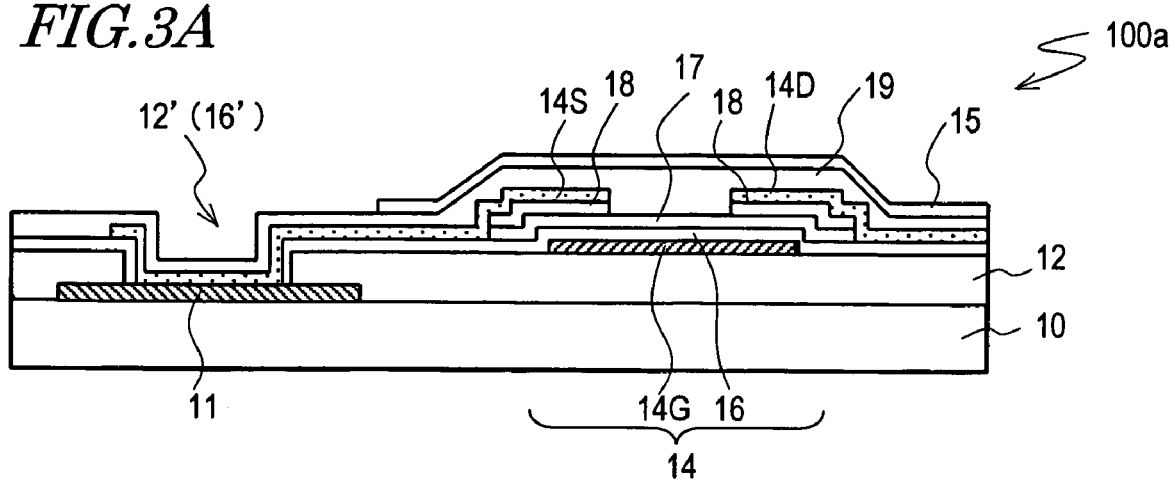
FIGS. 3A, 3B and 3C are cross-sectional views of the TFT substrate 100a of the LCD 100 as respectively viewed on the planes IIIa-IIIa, IIIb-IIIb and IIIc-IIIc shown in FIG. 1.

As shown in FIG. 3A, the TFT 14 of the TFT substrate 100a is preferably an amorphous silicon TFT of bottom gate type (which is also called an "inverse stagger type") including: a gate electrode 14G that is electrically connected to its associated gate line 13; a gate insulating film 16 that covers the gate electrode 14G; a semiconductor layer (i.e., an intrinsic semiconductor layer) 17 that has been formed over the gate electrode 14G with the gate insulating film 16 interposed between them; and source/drain electrodes 14S and 14D that have been formed on the semiconductor layer 17.

The source/drain regions of the semiconductor layer 17 are preferably electrically connected to the source/drain electrodes 14S and 14D by way of a doped semiconductor layer 18 that functions as a contact layer. Another region of the semiconductor layer 17 between the source/drain regions functions as a channel region, on which no doped semiconductor layer 18 is present.

Figure 3B:
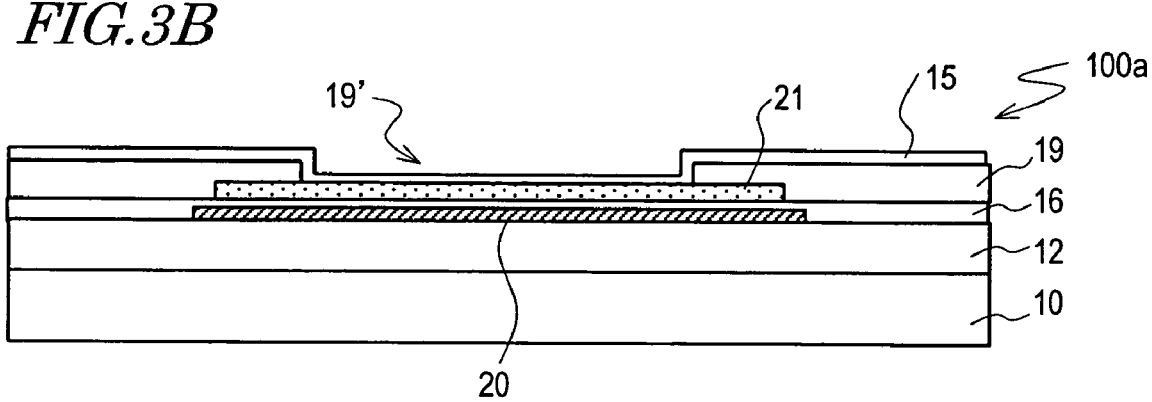

Also, as shown in FIG. 3B, the TFT substrate 100a further includes a plurality of storage capacitor lines 20, which are arranged over the substrate 10 with the first interlayer insulating film 12 interposed between them, and a plurality of storage capacitor electrodes 21, which face those storage capacitor lines 20 with the gate insulating film 16 interposed between them. A so-called "Cs on Com structure" is adopted for this TFT substrate 100a. The storage capacitor lines 20 have been formed by patterning the same conductive film as that of the gate lines 13 and gate electrodes 14G. The storage capacitor electrodes 21 have been formed by patterning the same conductive film as that of the source/drain electrodes 14S and 14D.

The second interlayer insulating film 19 has been formed so as to cover the TFT 14. And the pixel electrode 15 is located on the second interlayer insulating film 19. As shown in FIGS. 1 and 2, the pixel electrode 15 is in contact with, and electrically connected to, the drain electrode 14D of the TFT 14 through a contact hole 19' that has been cut through the second interlayer insulating film 19 over the drain electrode 14D. On the other hand, the storage capacitor electrode 21 is in contact with, and electrically connected to, the pixel electrode 15 through another contact hole 19' that has been cut through the second interlayer insulating film 19 over the storage capacitor electrode 21 as shown in FIG. 3B.

Figure 3C:
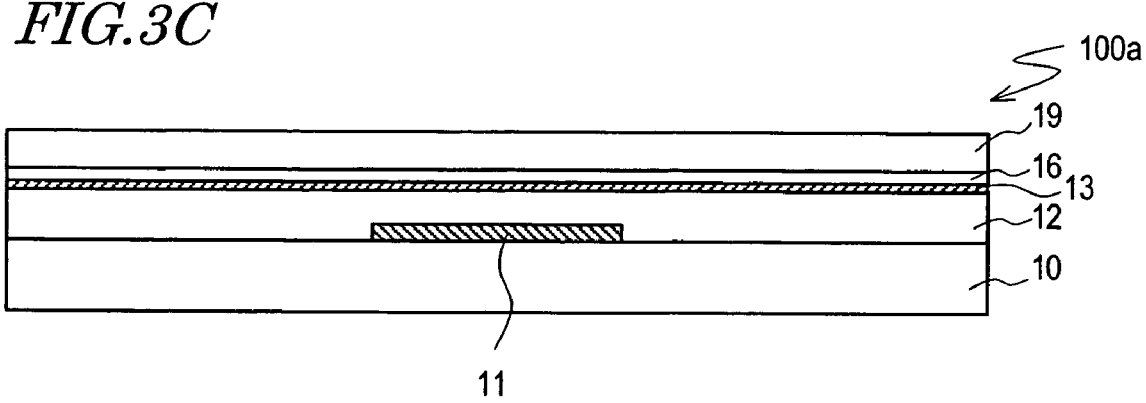

In the TFT substrate 100a of this preferred embodiment, the source line 11 is located under the gate line 13 with the first interlayer insulating film 12 interposed between them as shown in FIG. 3C. Also, as shown in FIGS. 2 and 3A, the source line 11 is electrically connected to the source electrode 14S of its associated TFT 14 by way of a contact hole 12' that has been cut through the first interlayer insulating film 12. More specifically, the source line 11 is in contact with the source electrode 14S of the TFT 14 within the contact hole 12' of the first interlayer insulating film 12 and a contact hole 16' that has been cut through the gate insulating film 16, and thereby electrically connected to the TFT 14.

Figure 16A:
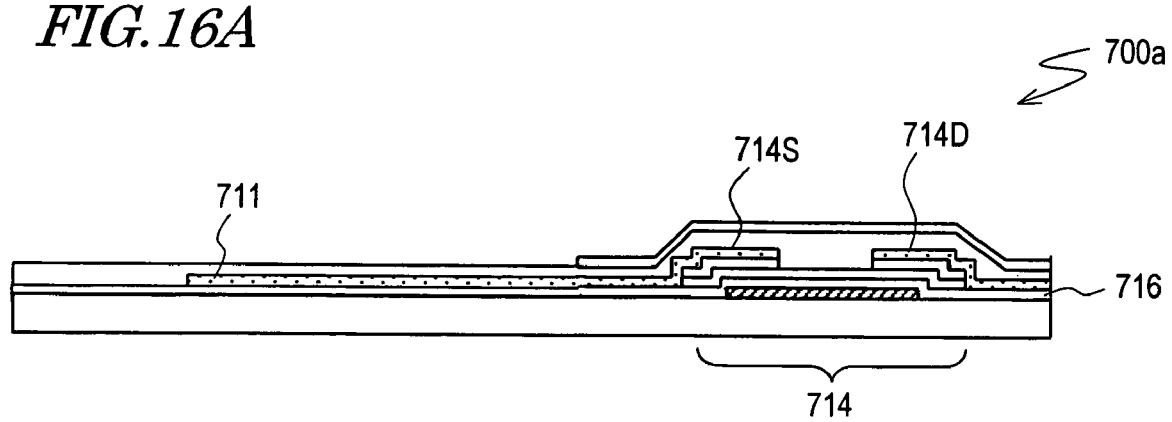
FIGS. 16A and 16B are cross-sectional views schematically illustrating a conventional active-matrix substrate 700a including a bottom-gate amorphous silicon TFT.
Figure 16B:
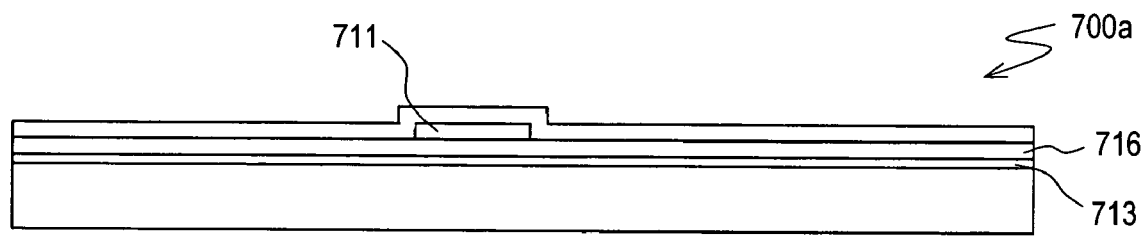

Hereinafter, the structure of a conventional TFT substrate 700a, including a bottom gate TFT, will be described with reference to FIGS. 16A and 16B. FIG. 16A is a cross-sectional view illustrating the TFT 714 and surrounding portions of the TFT substrate 700a (corresponding to FIG. 3A). FIG. 16B is a cross-sectional view schematically illustrating an intersection between a source line 711 and a gate line 713 (corresponding to FIG. 3C). In the conventional TFT substrate 700a, the source line 711 is located over the gate line 713 with a gate insulating film 716 interposed between them. In many cases, the source line 711 is formed by patterning the same conductive film as that of the source/drain electrodes 714S and 714D of the TFT 714.

In contrast, according to this preferred embodiment, the source line 11 is located under the gate line 13 with the first interlayer insulating film 12 interposed between them as shown in FIG. 3C. The first interlayer insulating film 12 does not function as a gate insulating film or a dielectric film for a storage capacitor. Accordingly, even if the first interlayer insulating film 12 were thickened or made of a material with a low dielectric constant, the drivability or storage capacitance value of the TFT 14 would not decrease. Consequently, the capacitance to be produced in the intersection between the gate line 13 and source line 11 can be reduced without decreasing the drivability or storage capacitance value of the TFT 14. In addition, since the first interlayer insulating film 12 is interposed between the source line 11 and the pixel electrode 15 and between the source line 11 and the counter electrode 51, the capacitance produced between the source line 11 and the pixel electrode 15 and the capacitance produced between the source line 11 and the counter electrode 51 can also be reduced.

To sufficiently reduce the capacitance produced in the intersection between the gate line 13 and the source line 11, the first interlayer insulating film 12 is preferably thicker, and preferably has a lower dielectric constant, than the gate insulating film 16.

The gate insulating film 16 typically has a thickness of about 0.2 μm to about 0.4 μm and a dielectric constant of about 5.0 to about 8.0. Meanwhile, the first interlayer insulating film 12 preferably has a thickness of 1.0 μm to 4.0 μm and a dielectric constant of 4.0 or less.

Also, the gate insulating film 16 is typically made of an inorganic insulator such as $SiN_x$ or $SiO_x$. On the other hand, the first interlayer insulating film 12 is preferably made of an insulator including an organic ingredient. As the material of the first interlayer insulating film 12, a spin-on-glass material including an organic ingredient (i.e., a so-called "organic SOG material") can be used effectively. Among other things, an SOG material of which the skeleton is an Si—O—C bond and an SOG material of which the skeleton is an Si—C bond are particularly preferred.

The SOG material is a material that can form a glass film (i.e., a silica based coating) by a coating technique such as spin coating. The organic SOG material has a low dielectric constant and can be made into a thick film easily. That is why by using an organic SOG material, the dielectric constant of the first interlayer insulating film 12 can be easily decreased and the thickness thereof can be easily increased.

As the SOG material having an Si—O—C bond as its skeleton, the material disclosed in Japanese Patent Application Laid-Open Publications Nos. 2001-98224 and 6-240455 and DD1100 produced by Dow Corning Toray Co., Ltd. and disclosed in Proceedings of IDW' 03, p. 617 may be used. As the SOG material having an Si—C bond as its skeleton, the material disclosed in Japanese Patent Application Laid-Open Publication No. 10-102003 may be used, for example.

Hereinafter, a method of fabricating the TFT substrate 100a will be described with reference to FIGS. 4A through 4I.

Figure 4A:
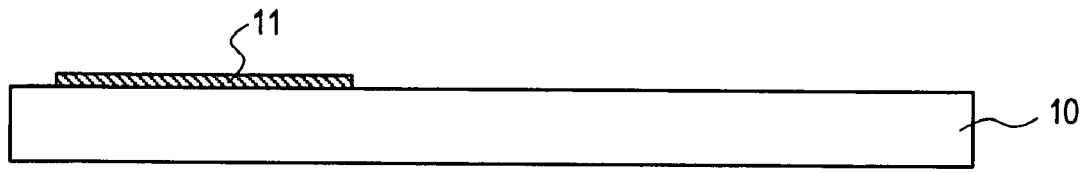

First, as shown in FIG. 4A, a molybdenum (Mo) film, an aluminum (Al) film and another molybdenum (Mo) film are stacked in this order by a sputtering process on an insulating substrate 10 of glass, for example, and the stack is patterned by a photolithographic process, thereby forming a source line 11. In this preferred embodiment, the thicknesses of the Mo, Al and Mo films are 150 nm, 500 nm and 50 nm in the descending order.

Figure 4B:
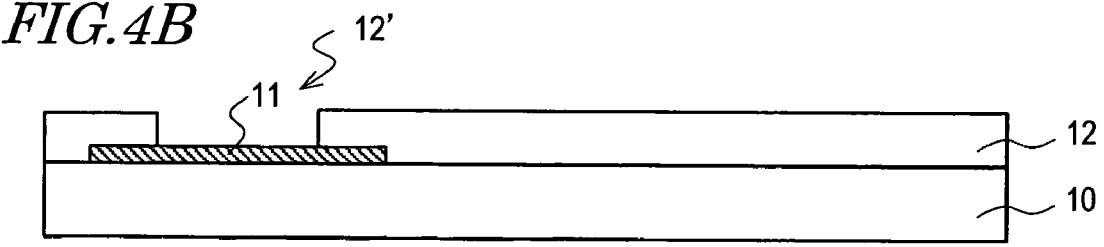

Next, as shown in FIG. 4B, the substrate 10 is coated with an organic SOG material by a spin coating process and then pre-baked and post-baked, thereby forming a first interlayer insulating film 12. Thereafter, a portion of the first interlayer insulating film 12, overlapping with the source line 11, is removed by a photolithographic process, thereby cutting a contact hole 12'. In this preferred embodiment, an organic SOG material is applied to a thickness of 1.5 μm, pre-baked at 150° C. for five minutes by a hot plate, and then post-baked at 350° C. for an hour by an oven, thereby forming a first interlayer insulating film 12 with a dielectric constant of 2.5. In etching the first interlayer insulating film 12, a dry etching process is carried out by using a mixture of carbon fluoride ($CF_4$) and oxygen ($O_2$).

Figure 4C:
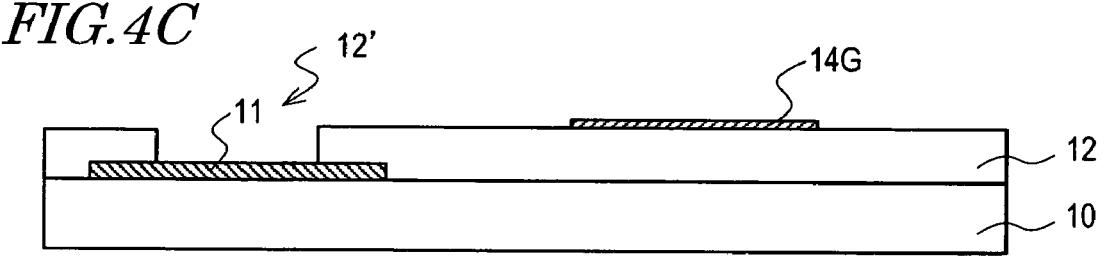

Next, as shown in FIG. 4C, an Mo film, an Al film and another Mo film are stacked in this order by a sputtering process and then the stack is patterned by a photolithographic process, thereby forming a gate electrode 14G. In this process step, gate lines 13 and storage capacitor lines 20 (neither is shown in FIG. 4C) are formed at the same time. In this preferred embodiment, the thicknesses of the Mo, Al and Mo films are 150 nm, 200 nm and 50 nm in the descending order.

Figure 4D:
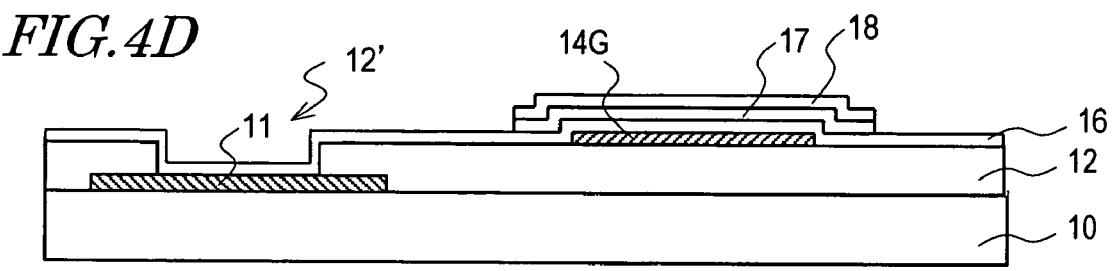

Subsequently, as shown in FIG. 4D, an $SiN_x$ film, an amorphous silicon (a-Si) film and an $n^+$-amorphous silicon ($n^+$ a-Si) film are deposited continuously by a CVD process, and then the a-Si film and the $n^+$ a-Si film are patterned by a photolithographic process (i.e., portions of the $n^+$ a-Si and a-Si films are dry-etched away), thereby forming an island-like semiconductor structure (i.e., semiconductor active regions) consisting of a gate insulating film 16, an intrinsic semiconductor layer 17 and a doped semiconductor layer 18. In this preferred embodiment, a gate insulating film 16 with a thickness of 0.4 μm and a dielectric constant of 7.0, an intrinsic semiconductor layer 17 with a thickness of about 50 nm to about 200 nm, and a doped semiconductor layer 18 with a thickness of about 40 nm are formed.

Figure 4E:
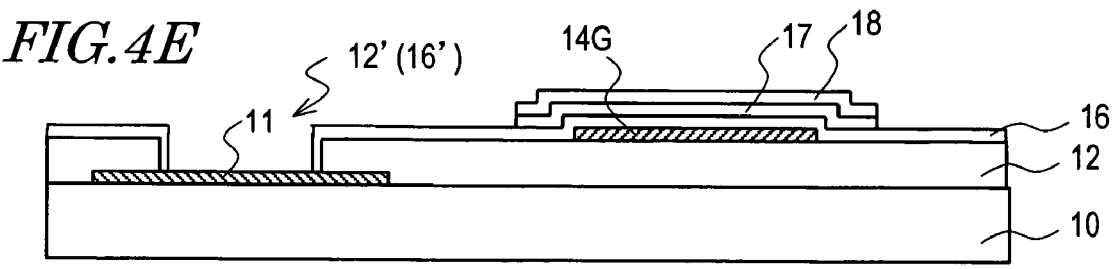

Thereafter, as shown in FIG. 4E, a portion of the gate insulating film 16 is removed by a photolithographic process from inside of the contact hole 12' of the first interlayer insulating film 12, thereby cutting a contact hole 16' through the gate insulating film 16.

Figure 4F:
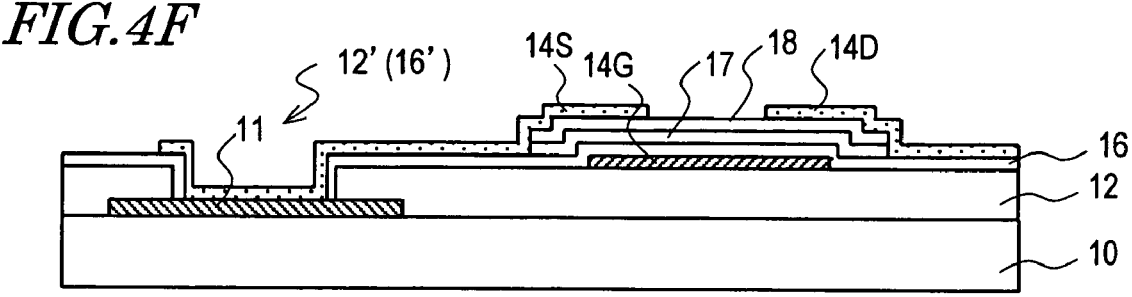

Subsequently, as shown in FIG. 4F, an Mo film is deposited by a sputtering process and then patterned by a photolithographic process, thereby forming a source electrode 14S, a drain electrode 14D and a storage capacitor electrode 21 (not shown in FIG. 4F), each having a thickness of 150 nm. The Mo film is preferably patterned by a wet etching process. As described above, in this preferred embodiment, the source/drain electrodes 14S, 14D and storage capacitor electrode 21 are formed on a different layer from the source lines 11 (i.e., these members are formed by patterning two different conductive films). For that reason, the material of the source/drain electrodes 14S, 14D and so on does not have to have as low resistance as that of the source lines 11. Accordingly, the source/drain electrodes 14S, 14D and so on may be made of Mo as in this preferred embodiment, a refractory metal such as titanium (Ti) or tantalum (Ta), or ITO. As a result, the manufacturing process can be shortened and the material costs can be cut down.

Figure 4G:
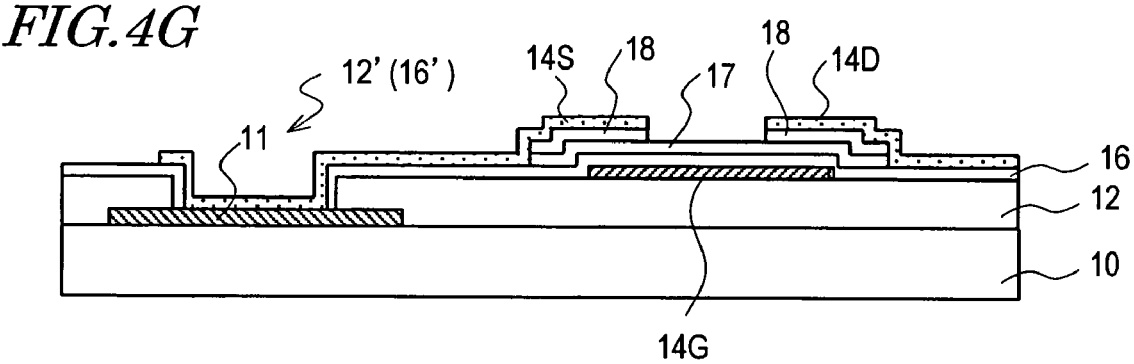

Next, as shown in FIG. 4G, a portion of the doped semiconductor layer 18, which will define a channel region for the island-like semiconductor structure, is dry-etched away by using the source/drain electrodes 14S and 14D as an etching mask. While that portion of the doped semiconductor layer 18 is being removed, the surface of the intrinsic semiconductor layer 17 is also lightly etched.

Figure 4H:
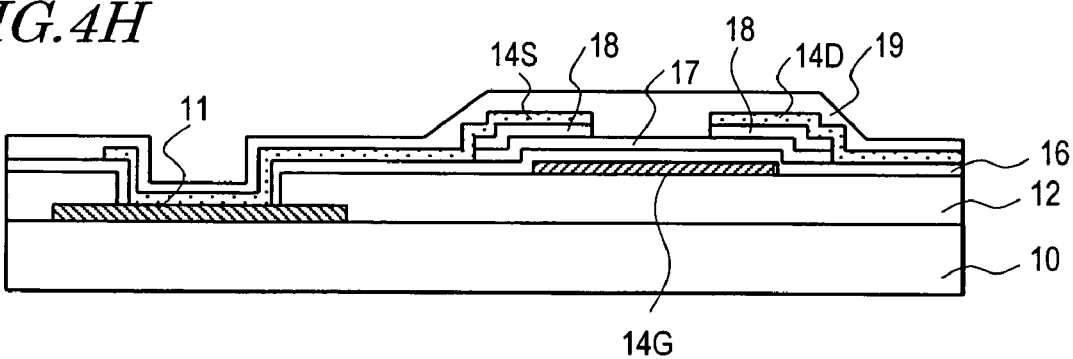

Thereafter, as shown in FIG. 4H, $SiN_x$ is deposited by a CVD process, thereby forming an interlayer insulating film 19 to a thickness of about 150 nm to about 700 nm over the entire surface of the substrate 10. And then a contact hole 19' (not shown in FIG. 4H) is cut by a photolithographic process. In this process step, the interlayer insulating film 19 may be a film of an organic insulator (e.g., a photosensitive resin material) with a thickness of about 1.0 μm to about 3.0 μm. Alternatively, the interlayer insulating film 19 may also be a stack of a film of $SiN_x$ or any other inorganic insulator and a film of such an organic insulator.

Figure 4I:
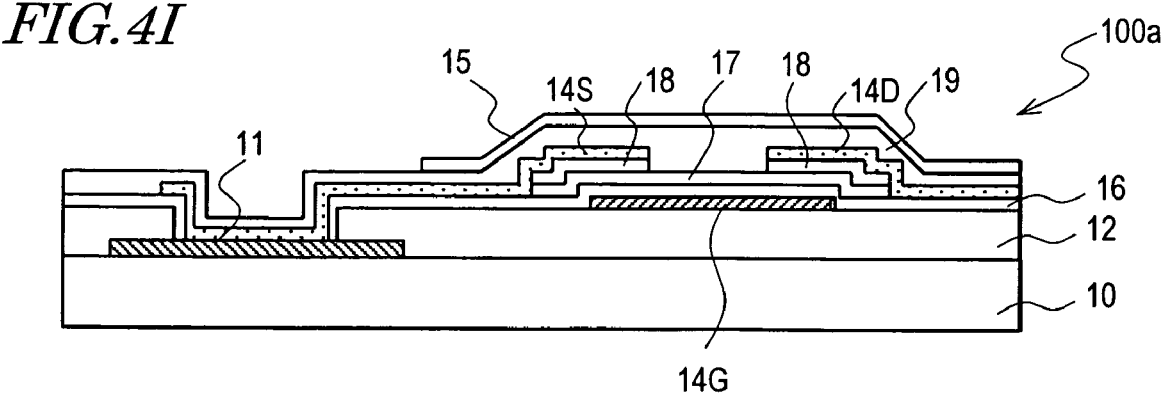
Figure 5:
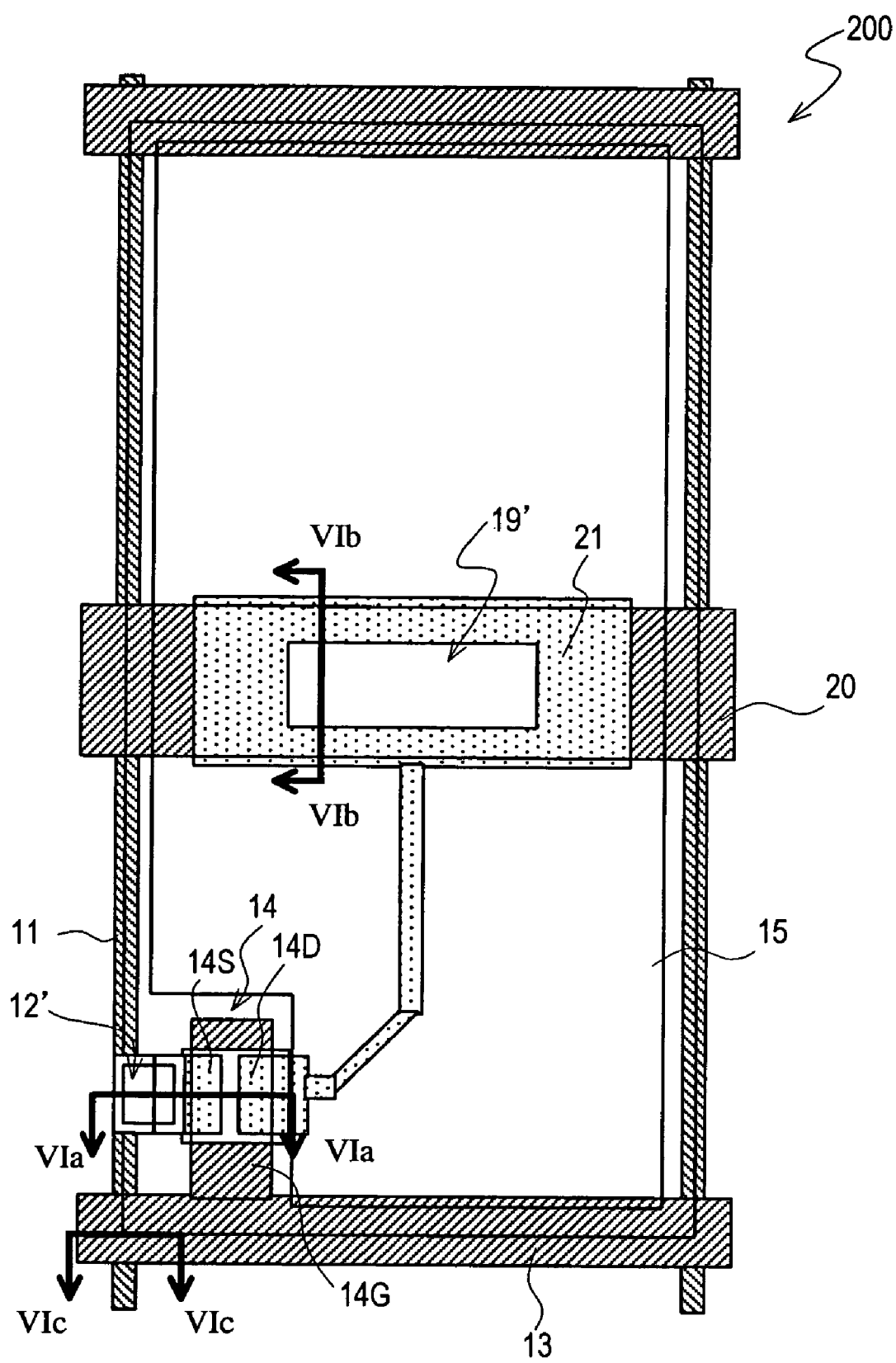
FIG. 5 is a plan view schematically illustrating an LCD 200 according to a second specific preferred embodiment of the present invention.

Finally, as shown in FIG. 4I, an ITO film is deposited to a thickness of 100 nm by a sputtering process and then patterned by a photolithographic process (e.g., wet-etched), thereby forming a pixel electrode 15. The pixel electrode 15 does not have to be made of a transparent conductive material such as ITO but may also be made of Al or any other metallic material with optical reflectivity.

In this manner, the TFT substrate 100a is completed. According to the method of this preferred embodiment, the first interlayer insulating film 12 has a thickness of 1.5 μm and a dielectric constant of 2.5. Thus, the capacitance to be produced in every intersection between the gate lines 13 and the source lines 11 has a capacitance value of $1.48 \times 10^{-5}$ pF per $\mu m^2$. Meanwhile, in a configuration in which a gate insulating film (with a thickness of 0.4 μm and a dielectric constant of 7.0 just like the counterpart of this preferred embodiment) is located between the gate lines and the source lines as in a conventional active-matrix substrate, the capacitance value per unit area will be $1.55 \times 10^{-4}$ $pF/\mu m^2$. Consequently, by adopting the configuration of this preferred embodiment, the value of the capacitance produced in every intersection can be reduced by more than 90%. In addition, since the first interlayer insulating film 12 is also provided between the source lines 11 and the pixel electrodes 15, the capacitance produced in the overlap portion between the source lines 11 and the pixel electrodes 15 can be reduced significantly, too. Furthermore, since the first interlayer insulating film 12 is also provided between the source lines 11 and the counter electrode 51, the capacitance produced between them can be reduced as well.

Embodiment 2

An LCD 200 according to a second specific preferred embodiment of the present invention will be described with reference to FIG. 5 and FIGS. 6A through 6C. The following description of the second preferred embodiment will be focused on the difference between the LCD 100 of the first preferred embodiment and the LCD 200 of the second preferred embodiment.

In the TFT substrate 200a of the LCD 200, the source line 11 and the source electrode 14S are connected together differently from the TFT substrate 100a of the first preferred embodiment. In the TFT substrate 100a, the source electrode 14S is directly in contact with the source line 11 within the contact hole 12' of the first interlayer insulating film 12, thereby electrically connecting the source line 11 and the source electrode 14S together as shown in FIG. 3A.

Figure 6A:
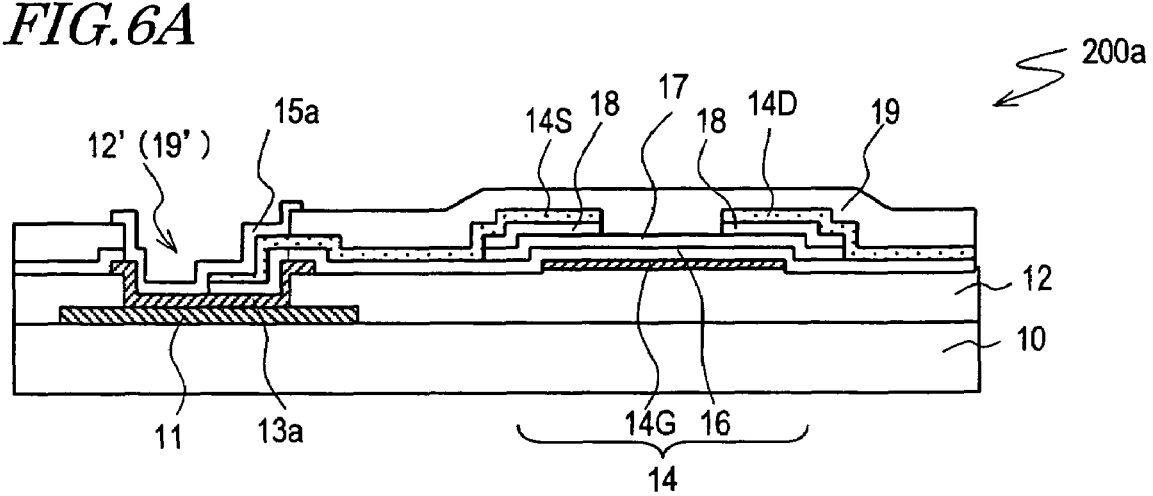
FIGS. 6A, 6B and 6C are cross-sectional views of the TFT substrate 200a of the LCD 200 as respectively viewed on the planes VIa-VIa, VIb-VIb and VIc-VIc shown in FIG. 5.
Figure 6B:
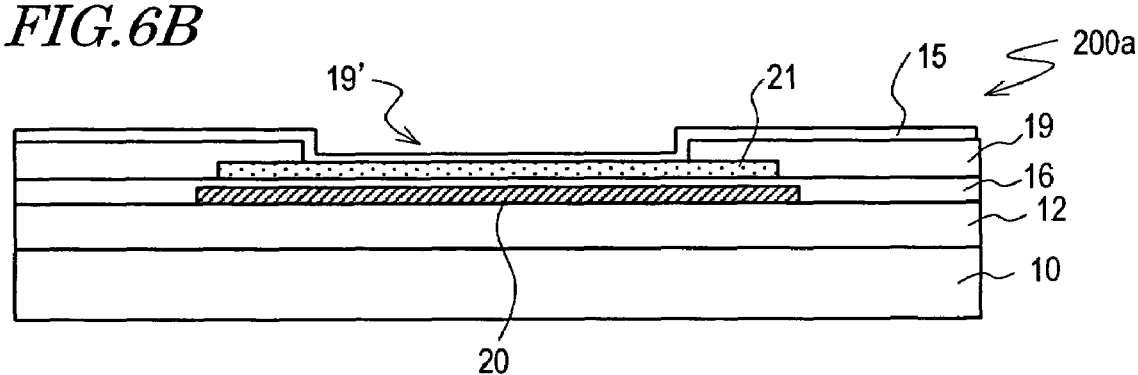

On the other hand, the TFT substrate 200a further includes a first conductive member 13a formed by patterning the same conductive film as the gate lines 13 and a second conductive member 15a formed by patterning the same conductive film as the pixel electrodes 15 as shown in FIG. 6A. The source line 11 of the TFT substrate 200a is electrically connected to the source electrode 14S by way of the first and second conductive members 13a and 15a.

More specifically, the first conductive member 13a makes a contact with the source line 11 within the contact hole 12' of the first interlayer insulating film 12 and the second conductive member 15a makes a contact with the first conductive member 13a and the source electrode 14S within the contact hole 19' of the second interlayer insulating film 19. As a result, the source line 11 is electrically connected to the source electrode 14S.

Figure 6C:
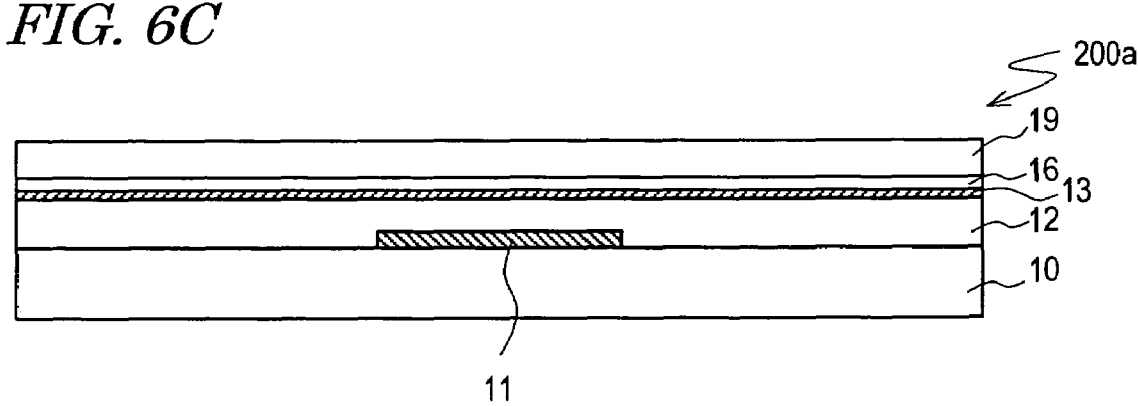

In the TFT substrate 200a of this second preferred embodiment, the source lines 11 are also located under the gate lines 13 with the first interlayer insulating film 12 interposed between them as shown in FIG. 6C. Consequently, the capacitance produced in every intersection between the gate lines 13 and source lines 11, the capacitance produced between each source line 11 and its associated pixel electrode 15, and the capacitance produced between the source lines 11 and the counter electrode 51 can all be reduced without decreasing the drivability of the TFTs 14 or the capacitance value of the storage capacitors.

Furthermore, in this preferred embodiment, the source lines 11 are electrically connected to the source electrodes by way of the first conductive member 13a that has been formed by patterning the same conductive film as the gate lines 13 and the second conductive member 15a that has been formed by patterning the same conductive film as the pixel electrodes 15. By adopting such a configuration, a number of advantages are achieved in manufacturing process as will be described later.

Hereinafter, a method for fabricating the TFT substrate 200a will be described with reference to FIGS. 7A through 7H.

Figure 7A:
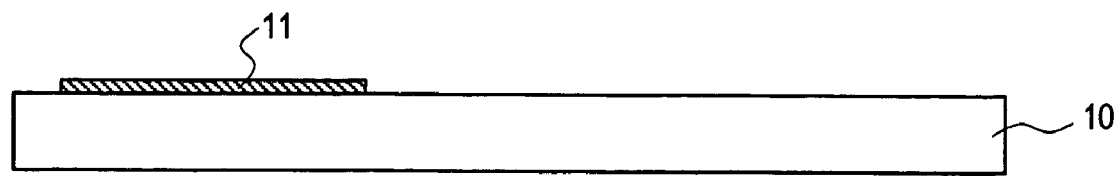

First, as shown in FIG. 7A, a conductive film is deposited by a sputtering process on an insulating substrate 10 of glass, for example, and then patterned by a photolithographic process, thereby forming a source line 11.

Figure 7B:
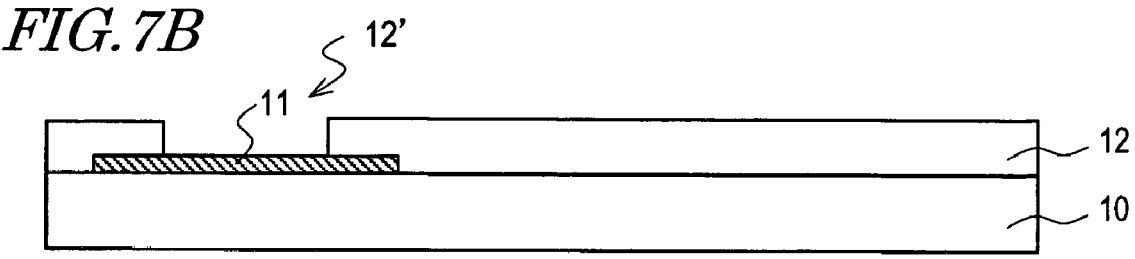

Next, as shown in FIG. 7B, the substrate 10 is coated with an organic SOG material by a spin coating process and then pre-baked and post-baked, thereby forming a first interlayer insulating film 12. Thereafter, a portion of the first interlayer insulating film 12, overlapping with the source line 11, is removed by a photolithographic process, thereby cutting a contact hole 12'.

Figure 7C:
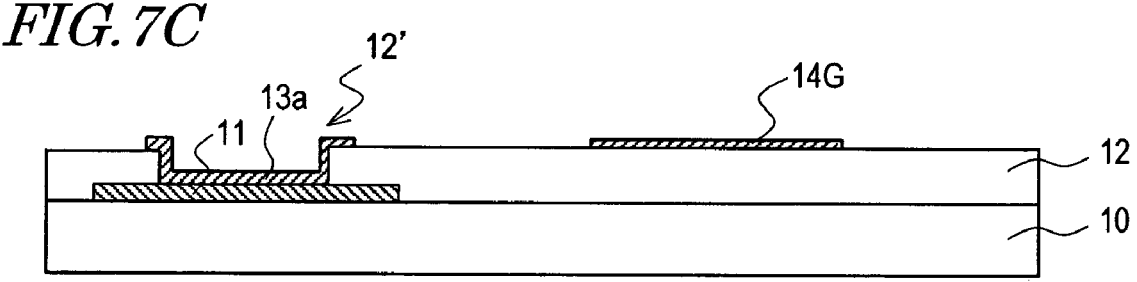

Next, as shown in FIG. 7C, another conductive film is deposited by a sputtering process and then patterned by a photolithographic process, thereby forming a gate electrode 14G and a first conductive member 13a. In this process step, the first conductive member 13a is formed so as to make a contact with the source line 11 within the contact hole 12' that has been cut through the first interlayer insulating film 12. Also, in this process step, gate lines 13 and storage capacitor lines 20 (neither is shown in FIG. 7C) are formed at the same time.

Figure 7D:
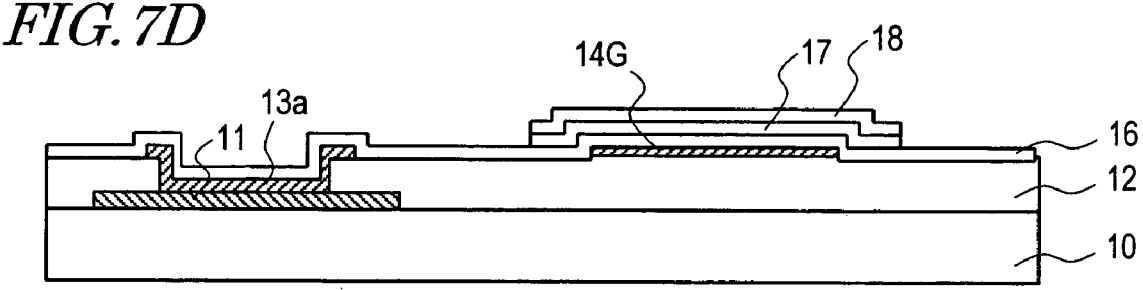

Subsequently, as shown in FIG. 7D, an inorganic insulating film, an intrinsic semiconductor film and a doped semiconductor film are deposited continuously by a CVD process, and then the intrinsic semiconductor film and the doped semiconductor film are patterned by a photolithographic process, thereby forming an island-like semiconductor structure consisting of a gate insulating film 16, an intrinsic semiconductor layer 17 and a doped semiconductor layer 18.

Figure 7E:
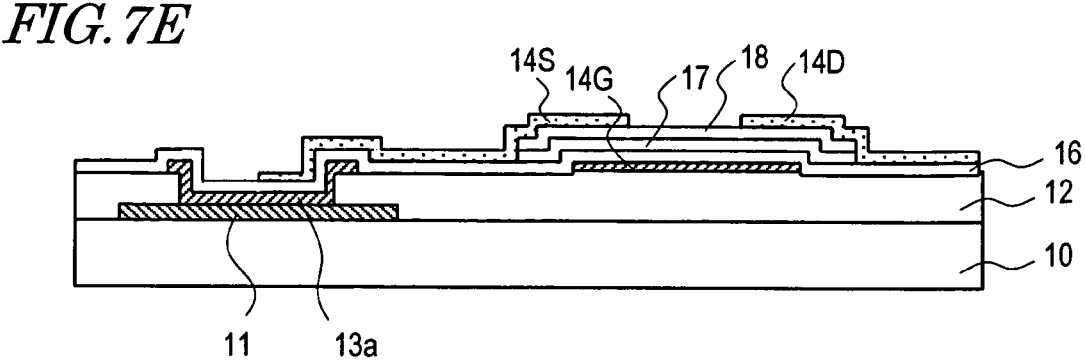

Thereafter, as shown in FIG. 7E, a conductive film is deposited by a sputtering process and then patterned by a photolithographic process, thereby forming a source electrode 14S, a drain electrode 14D and a storage capacitor electrode 21 (not shown in FIG. 7E).

Figure 7F:
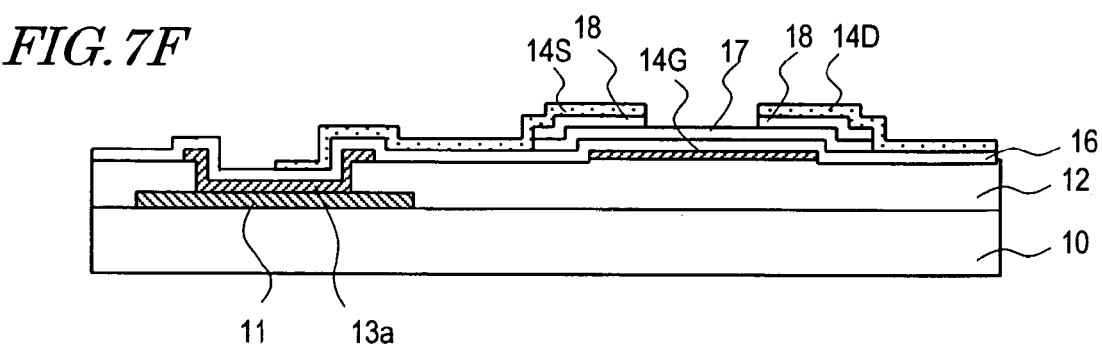

Next, as shown in FIG. 7F, a portion of the doped semiconductor layer 18, which will define a channel region for the island-like semiconductor structure, is dry-etched away by using the source/drain electrodes 14S and 14D as an etching mask. While that portion of the doped semiconductor layer 18 is being removed, the surface of the intrinsic semiconductor layer 17 is also lightly etched.

Figure 7G:
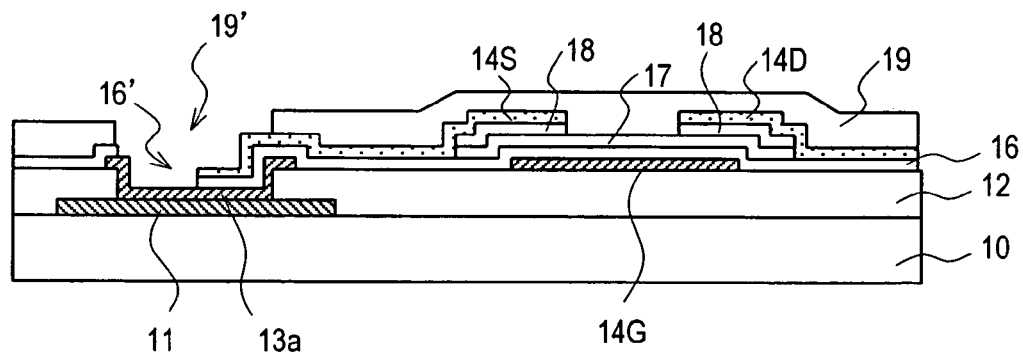

Thereafter, as shown in FIG. 7G, a second interlayer insulating film 19 is deposited by a CVD process over the entire surface of the substrate 10. And then a contact hole 19' is cut by removing a portion of the second interlayer insulating film 19 by a photolithographic process. In this process step, a portion of the gate insulating film 16 (i.e., a portion overlapping with the source line 11) is also removed to make a contact hole 16' through the gate insulating film 16, too.

Figure 7H:
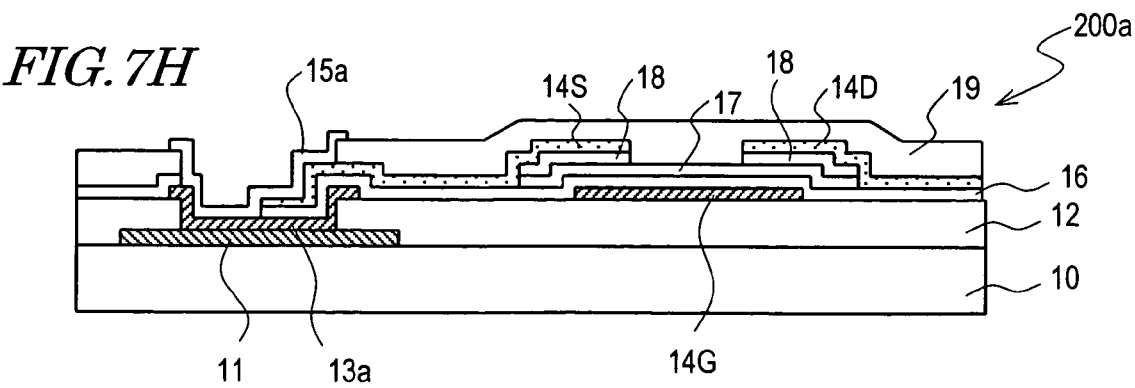

Finally, as shown in FIG. 7H, an ITO film is deposited by a sputtering process and then patterned by a photolithographic process, thereby forming a pixel electrode 15 and a second conductive member 15a. In this process step, the second conductive member 15a is formed so as to make a contact with both the first conductive member 13a and the source electrode 14S within the contact hole 19' of the second interlayer insulating film 19. In this manner, the TFT substrate 200a is completed.

This preferred embodiment adopts an arrangement in which the source line 11 is electrically connected to the source electrode 14S by way of the first and second conductive members 13a and 15a. Thus, a contact hole can be made through both the second interlayer insulating film 19 and gate insulating film 16 at the same time as described above. That is to say, the process step of cutting a contact hole through only the gate insulating film 16 (i.e., the process step shown in FIG. 4E) can be omitted. As a result, the number of photomasks used, and eventually the overall manufacturing cost, can be reduced.

Figure 8:
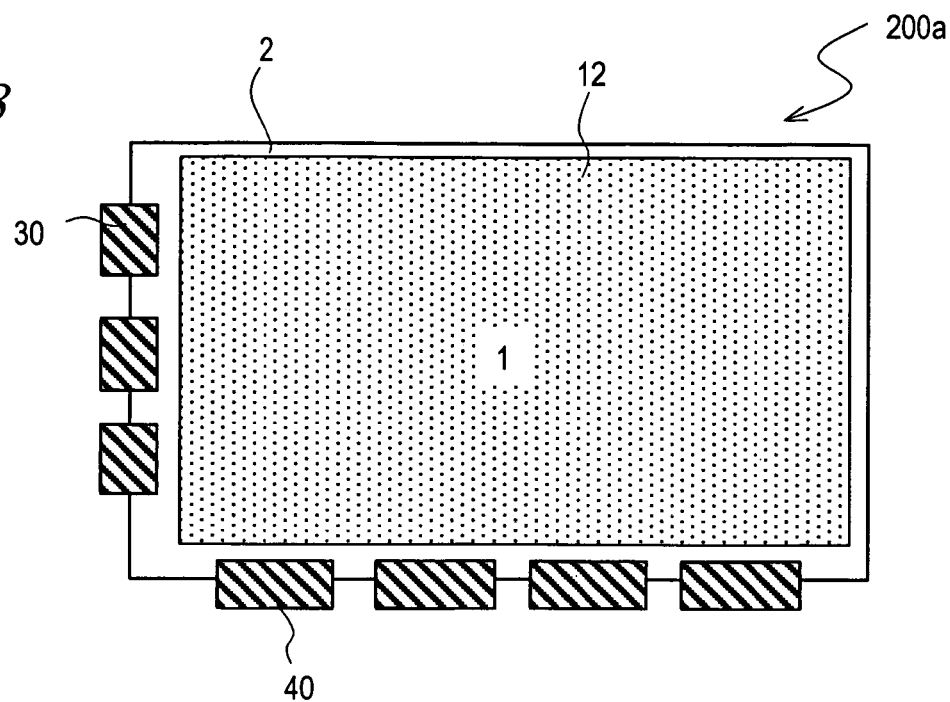

It should be noted that a film made of an organic SOG material is usually less resistible to mechanical and thermal stresses, and more likely to crack, than an inorganic film made of $SiN_x$, for example. That is why if the first interlayer insulating film 12 is made of an organic SOG material, the first interlayer insulating film 12 is preferably substantially non-existent in the non-display area 2 as shown in FIG. 8 to minimize cracking.

The non-display area 2 is located around a display area 1, which is defined by a plurality of pixel regions that are arranged in matrix, and is sometimes called a "picture frame area". In the non-display area 2, provided are a plurality of terminals at which signals for driving the pixel regions are received. And gate drivers 30 and source drivers 40 are connected to those terminals. Stress is easily placed on the non-display area 2 in the process step of mounting or dicing. Thus, the cracking phenomenon can be minimized by making the first interlayer insulating film 12 non-existent in the non-display area 2.

Also, the thicker the first interlayer insulating film 12 and the bigger the size of the substrate, the more easily such cracking occurs. The present inventors carried out an intensive research on what effects the material of the first interlayer insulating film 12 had on such cracking phenomenon. As a result, the present inventors discovered that by using an SOG material including a filler made of silica (i.e., a silica filler), the cracking phenomenon could be minimized and the first interlayer insulating film 12 could be thickened even in a big active-matrix substrate.

Figure 9:
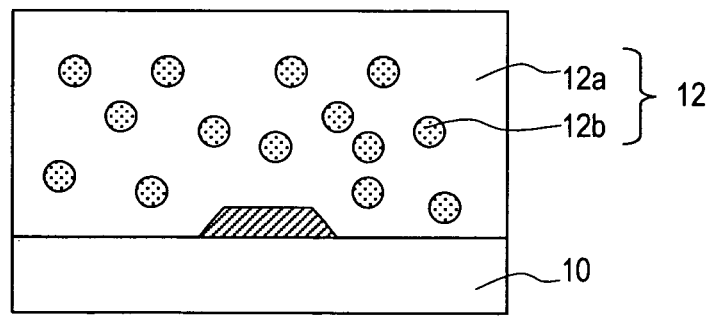
FIG. 9 is a cross-sectional view schematically illustrating a first interlayer insulating film made of an organic SOG material including a silica filler.

FIG. 9 schematically illustrates a cross-sectional structure of the first interlayer insulating film 12 made of an organic SOG material including a silica filler. As shown in FIG. 9, the first interlayer insulating film 12 has a structure in which silica filler particles 12b are dispersed in a matrix 12a made of an organic SOG material. By adopting such a structure, the silica filler particles 12b relax the stress and minimize the cracking phenomenon, thus making it easier to thicken the first interlayer insulating film 12 even on a big substrate. The silica filler 12b typically has a particle size of 10 nm to 30 nm and the ratio of the silica filler 12b to the overall first interlayer insulating film 12 is typically 20 vol % to 80 vol %. As an organic SOG material including a silica filler, LNT-025 produced by Catalysts and Chemicals Industries Co., Ltd. may be used, for example.

Figure 10:
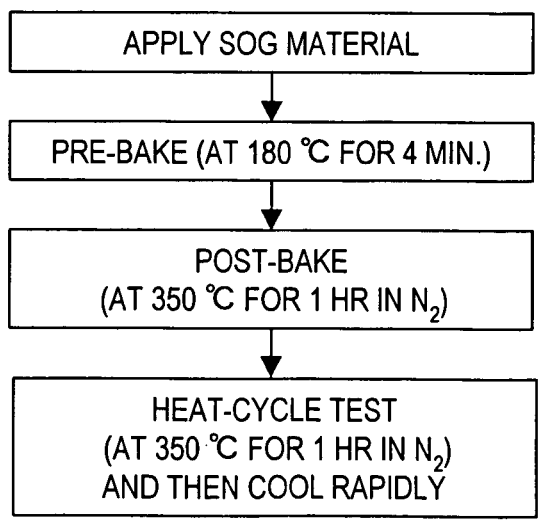
FIG. 10 is a flowchart showing the procedure of evaluating non-crackability.

The present inventors conducted a crackability test on an organic SOG film with a silica filler and an organic SOG film with no silica fillers. The results are shown in the following Table 1. As a sample substrate, a glass substrate (Corning 1737) with dimensions of 360 mm×465 mm was used. The crackability was evaluated following the procedure shown in FIG. 10. Specifically, an SOG material was applied onto the sample substrate, pre-baked at 180° C. for four minutes, and then post-baked at 350° C. for an hour within a nitrogen atmosphere, thereby forming an SOG film. Then, the substrate on which the SOG film had been deposited was subjected to a heat cycle test, in which the substrate was kept heated at 350° C. for an hour within the nitrogen atmosphere and then rapidly cooled.

TABLE 1

| Thickness | With no filler | With filler |
|---|---|---|
| 1.0 μm | ○ | ○ |
| 1.5 μm | X | ○ |
| 2.0 μm | X | ○ |
| 2.5 μm | X | ○ |
| 3.0 μm | X | ○ |

As can be seen from Table 1, if no filler was added, the cracking phenomenon sometimes occurred (as indicated by the crosses "x") when the thickness was 1.5 μm or more. On the other hand, if a filler was added, the cracking phenomenon still could be checked even when the thickness was increased to 3.0 μm.

Embodiment 3

FIG. 11 and FIGS. 12A through 12D schematically illustrate an LCD 300 according to a third specific preferred embodiment of the present invention.

As shown in FIG. 11 and FIGS. 12A through 12C, the TFT substrate 300a of the LCD 300 of this preferred embodiment has almost the same configuration as the TFT substrate 200a of the LCD 200 of the second preferred embodiment described above.

Figure 11:
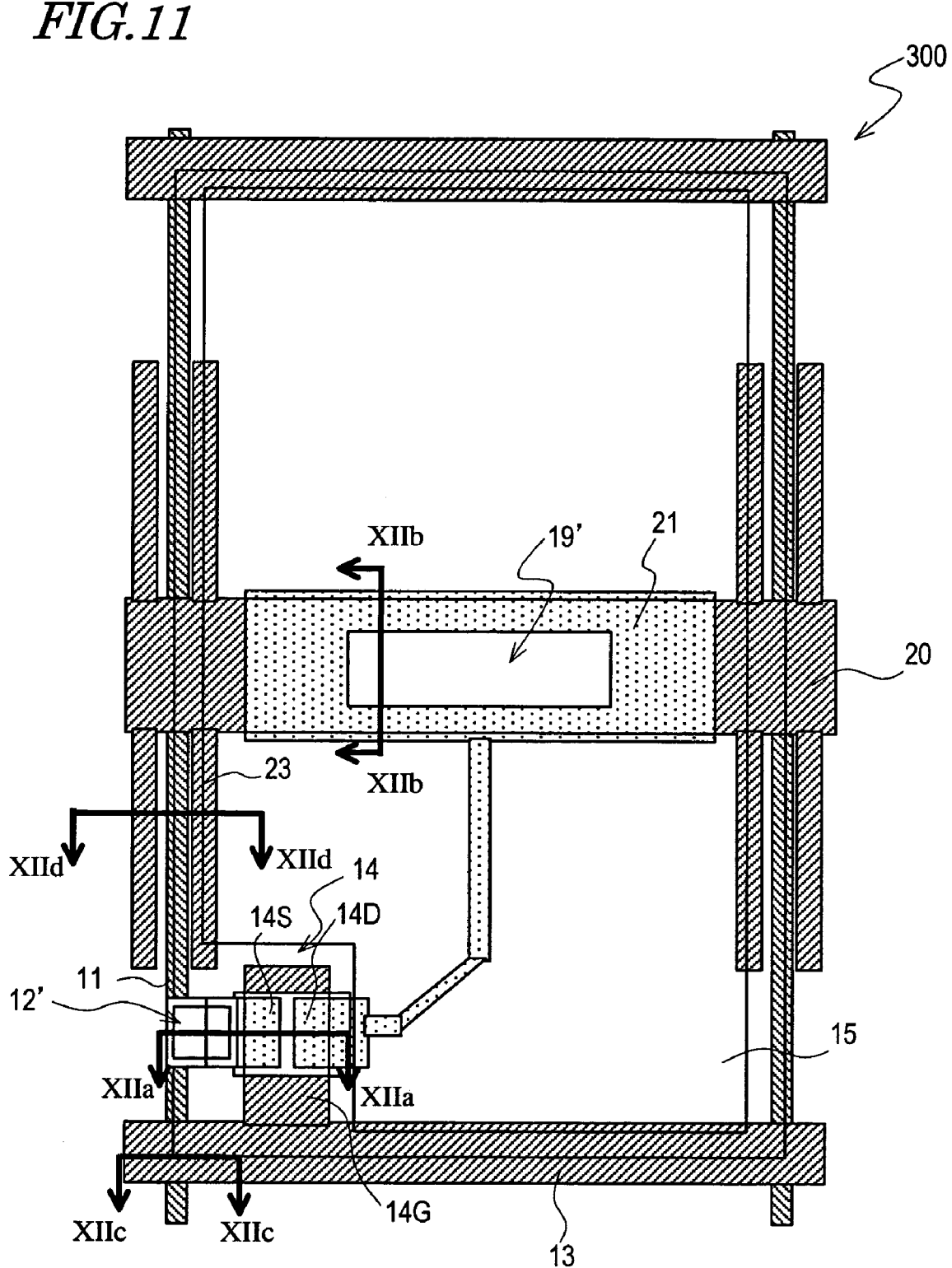
FIG. 11 is a plan view schematically illustrating an LCD 300 according to a third specific preferred embodiment of the present invention.
Figure 12A:
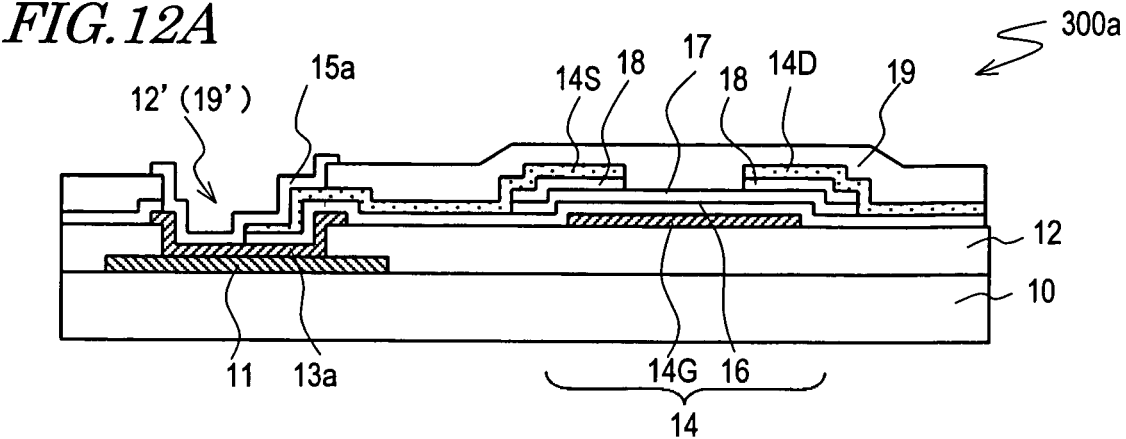
FIGS. 12A, 12B, 12C and 12D are cross-sectional views of the TFT substrate 300a of the LCD 300 as respectively viewed on the planes XIIa-XIIa, XIIb-XIIb, XIIc-XIIc and XIId-XIId shown in FIG. 11.
Figure 12B:
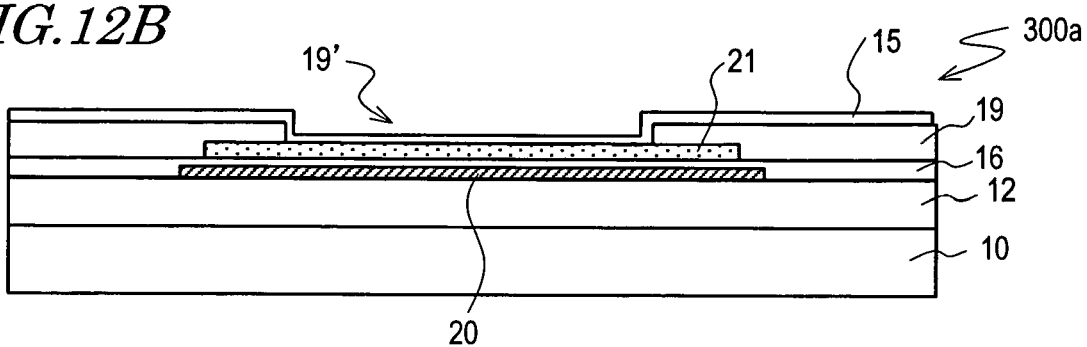
Figure 12C:
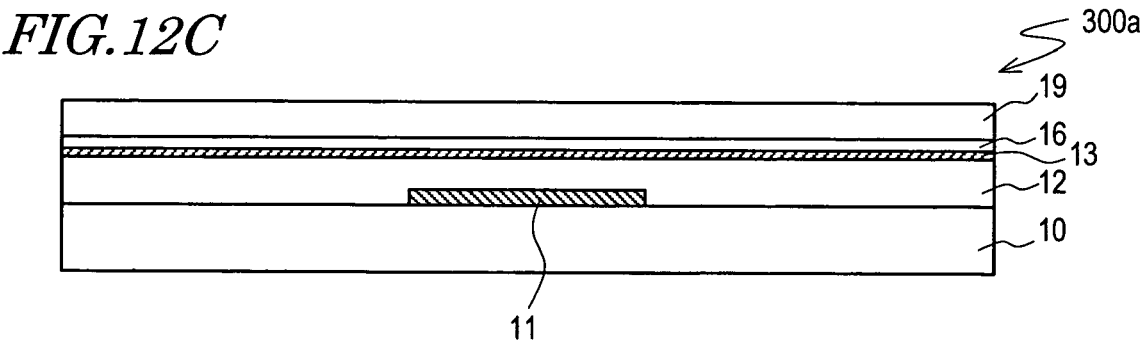
Figure 12D:
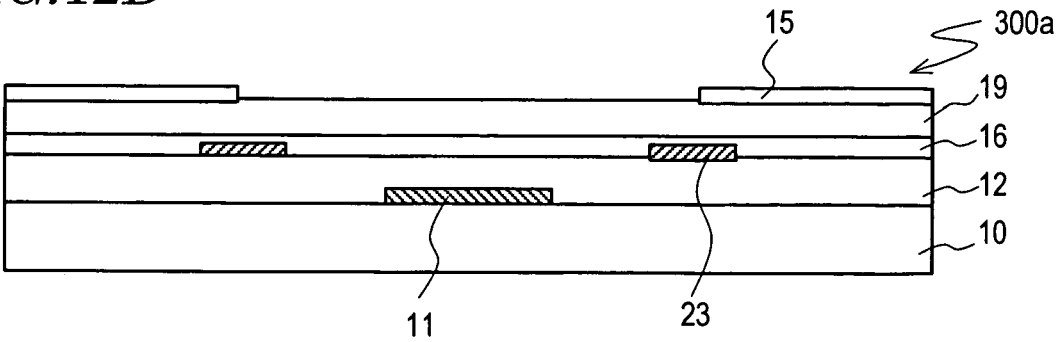

However, unlike the TFT substrate 200a of the LCD 200, the TFT substrate 300a of the LCD 300 of this preferred embodiment includes a plurality of shield electrodes 23, extending substantially parallel to the source lines 11, as shown in FIGS. 11 and 12D.

In this preferred embodiment, the shield electrodes 23 are formed by patterning the same conductive film as the gate lines 13. These shield electrodes 23 are connected to the storage capacitor line 20 and are supplied with a constant potential. Hereinafter, problems that may happen without the shield electrodes 23 and advantages achieved by providing the shield electrodes 23 will be described.

Figure 13:
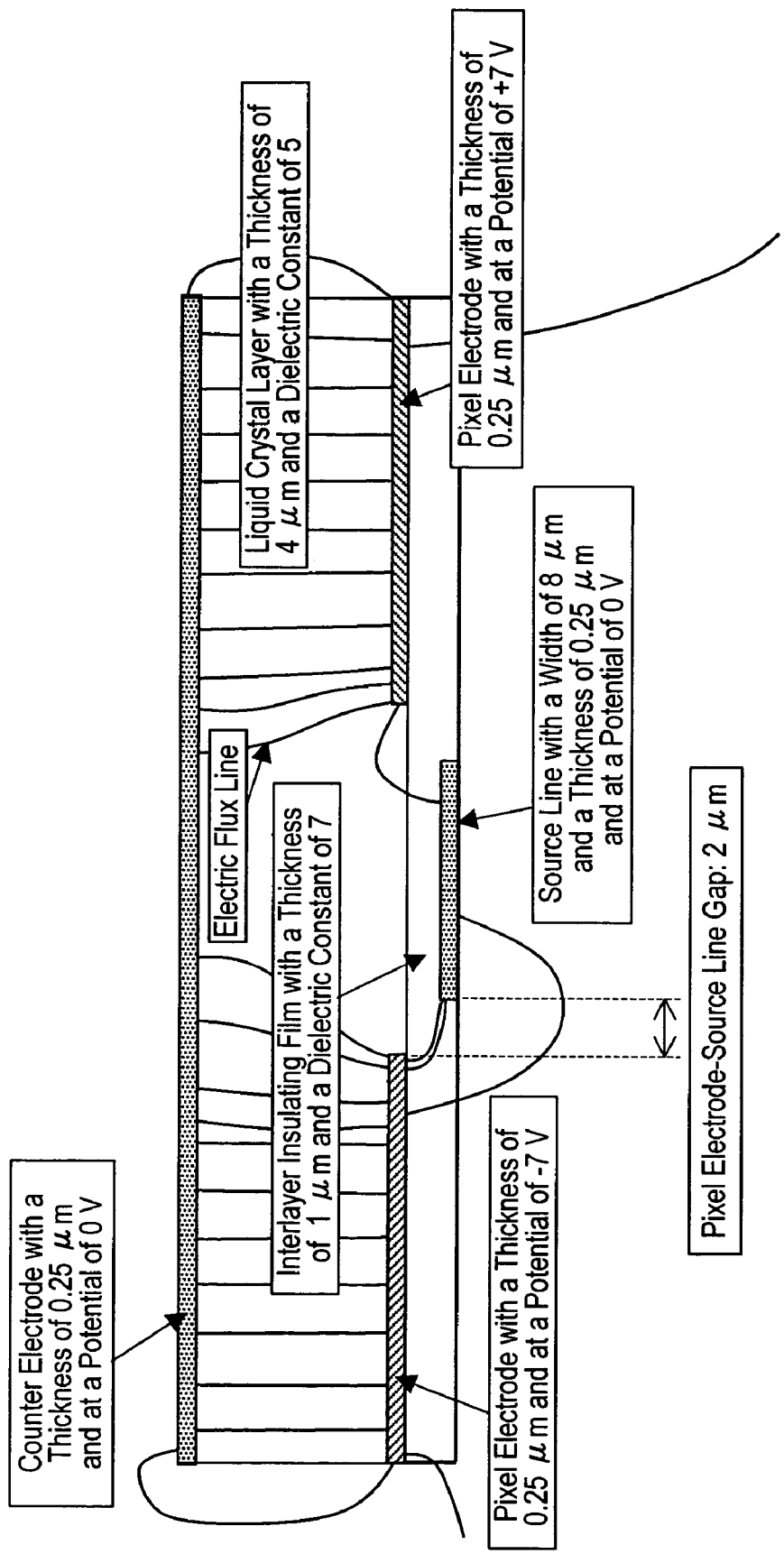
FIG. 13 shows simulated electric fields (electric flux lines) to be created when a voltage is applied to an LCD including a conventional active-matrix substrate.
Figure 14:
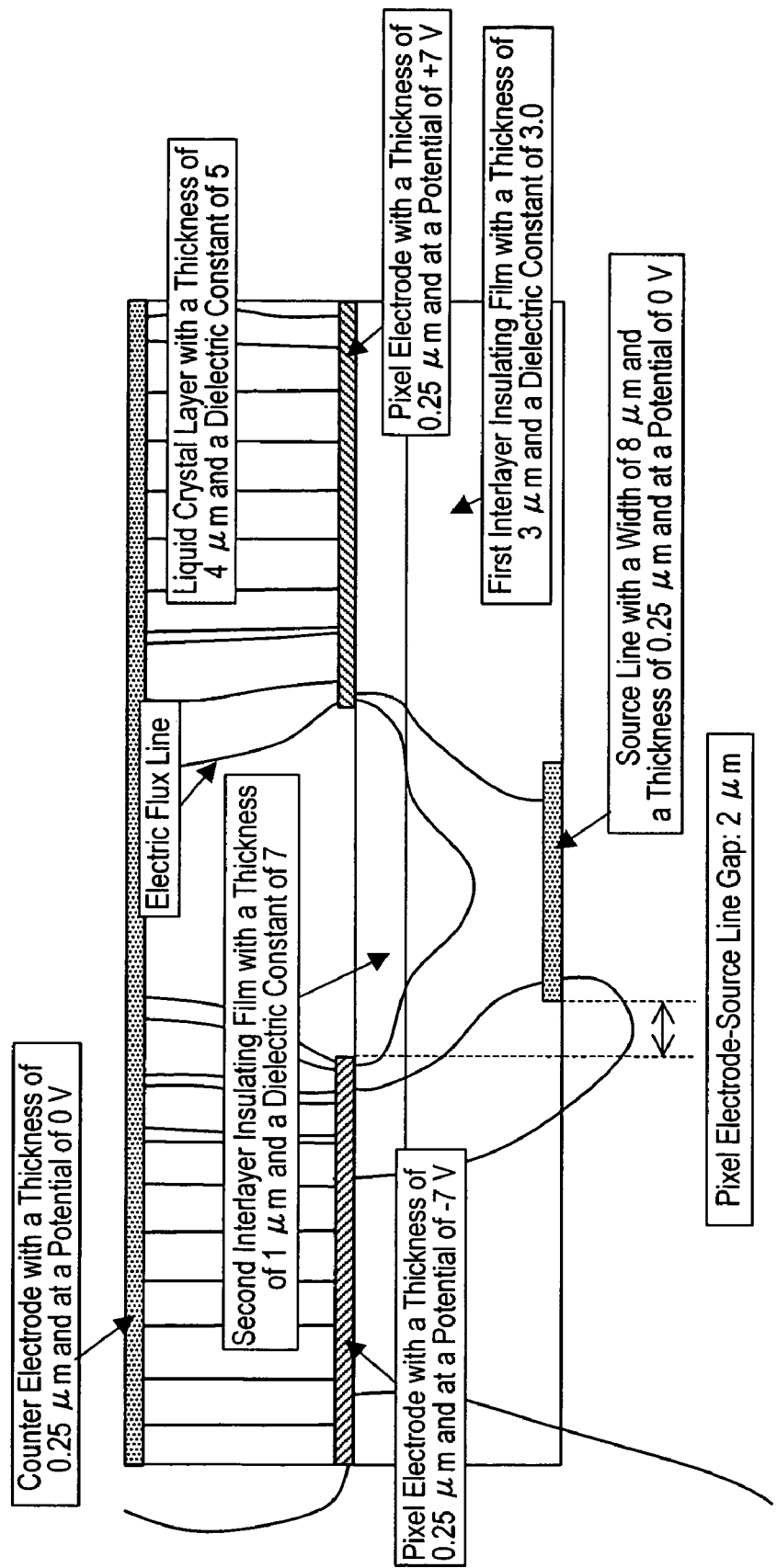
FIG. 14 shows simulated electric fields (electric flux lines) to be created when a voltage is applied to an LCD with no shield electrodes.

FIG. 13 shows simulated electric fields (electric flux lines) to be created when a voltage is applied to an LCD including a conventional active-matrix substrate. The cell parameters used to make this simulation (i.e., the thicknesses, widths, dielectric constants, and applied potentials of respective members) are as shown in FIG. 13. As shown in FIG. 13, the electric flux lines are formed so as to connect not only the pixel electrodes to the counter electrode but also the pixel electrodes to the source lines as well. That is to say, an electrostatic capacitance happens to be created between the pixel electrodes and the source lines. As a result, the potential at the pixel electrodes, which should be kept constant throughout a frame, varies as being affected by a variation in potential on the source lines. A similar problem may also happen even if the source lines are provided under the gate lines with the first interlayer insulating film interposed between them as shown in FIG. 14.

Figure 15:
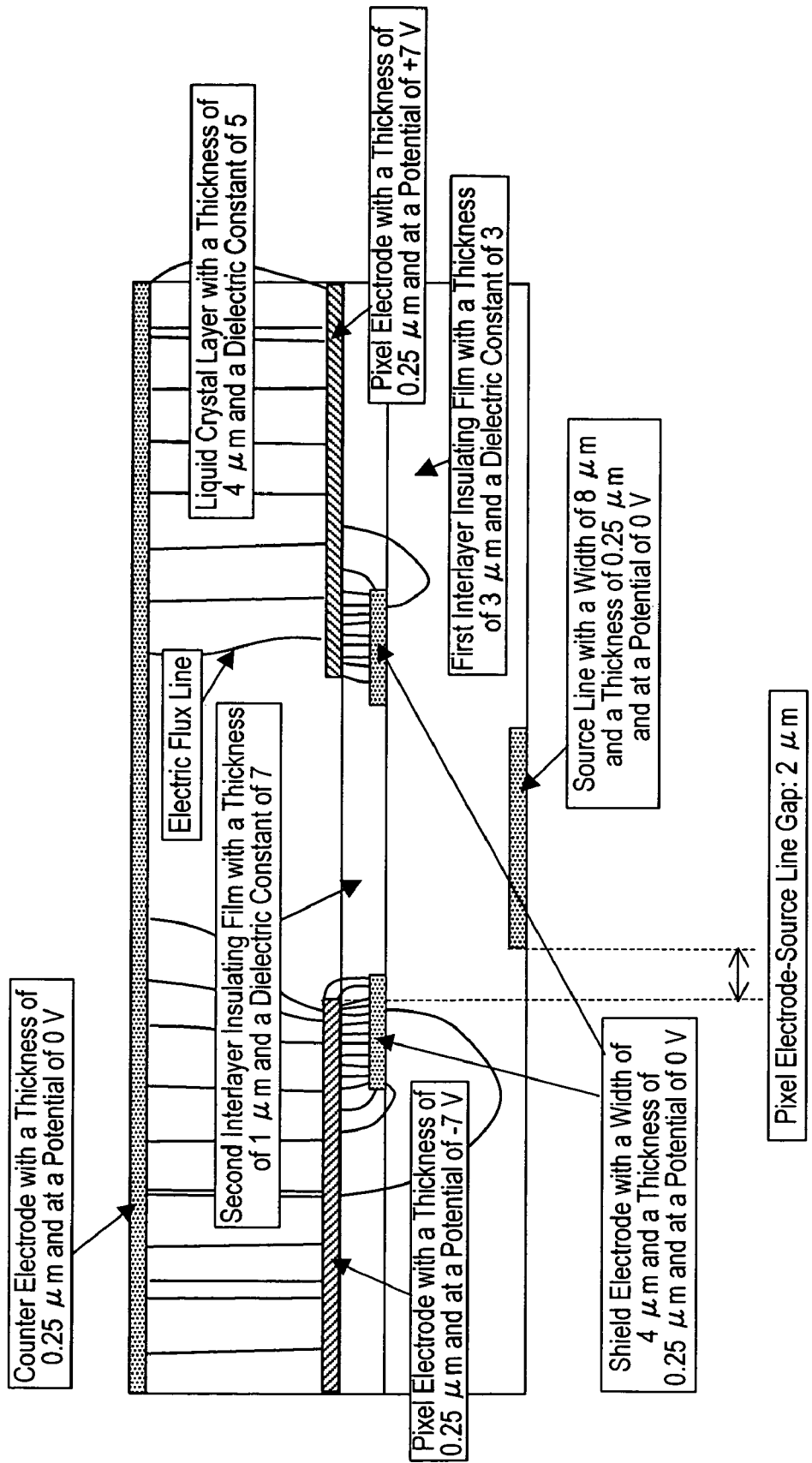
FIG. 15 shows simulated electric fields (electric flux lines) to be created when a voltage is applied to the LCD 300.

On the other hand, if the shield electrodes 23 are provided, then the electric flux lines, emitted from the pixel electrodes 15 toward the source lines 13, can be guided toward the shield electrodes 23 as shown in FIG. 15, thus preventing a capacitance from being produced between the pixel electrodes 15 and the source lines 13. As a result, it is possible to avoid an unwanted situation where the potential at the pixel electrodes 15 varies as being affected by the potential on the source lines 13. That is to say, the shield electrodes 23 have the function of shielding the pixel electrodes 15 from an electric field generated by the source lines 11.

It should be noted that even if such shield electrodes are provided for the conventional active-matrix substrate shown in FIG. 13, the influence of the potential on the source lines 11 can also be reduced to a certain degree. However, the effects of the shield electrodes are achieved most significantly in an arrangement in which the source lines 11 are provided under the gate lines 13 with the first interlayer insulating film 12 interposed between them as in the TFT substrate 300a of this preferred embodiment. Contrary to the conventional active-matrix substrate, the source lines 11 are located under the gate lines 13. Thus, the shield electrodes 23 (which are typically made of the same conductive film as the gate lines 13) can be easily provided over the source lines 11 (i.e., between the source lines 11 and the pixel electrodes 15). As a result, high shielding effects are easily achieved as shown in FIG. 15.

To guide more electric flux lines from the pixel electrodes 15 toward the shield electrodes 23 and to reduce the variation in the potential at the pixel electrodes 15 more effectively, an edge of the shield electrode 23, facing the source line 11, is preferably located closer to the source line 11 than the associated edge of the pixel electrode 15 as shown in FIG. 12D.

Also, in an LCD, light sometimes leaks through the gap between the gate line 13 and the pixel electrode 15. Thus, this gap is preferably shielded from light by providing an opaque member (which is also called a "black matrix") for the counter substrate. However, such an opaque member on the counter substrate is a little oversized in order to bond the substrates together as accurately as possible. That is why the opaque member may possibly decrease the aperture ratio and transmittance of the LCD. Nevertheless, if the shield electrode 23 (which is typically made of an opaque material and may function as an opaque layer) is provided such that it overlaps with the edge of the pixel electrode 15 as shown in FIG. 12D, then the opaque member on the counter substrate may have a narrower width. As a result, the aperture ratio and transmittance of the LCD can be increased.

Various preferred embodiments of the present invention described above provide an active-matrix substrate that can reduce the capacitance produced in the intersections between the gate lines and source lines without increasing the wiring resistance or decreasing the drivability of switching elements, and also provide a display device including such an active-matrix substrate.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Application No. 2004-254876 filed in Japan on Sep. 1, 2004, the entire contents of which are hereby incorporated by reference.

What is claimed is:

1. An active-matrix substrate comprising:
    a base substrate;
    a plurality of source lines provided on the base substrate;
    a plurality of gate lines, which are arranged so as to cross the source lines;
    a plurality of thin-film transistors, which have been formed on the base substrate and each of which operates in response to a signal that has been supplied to an associated one of the gate lines; and
    a plurality of pixel electrodes, each of which is electrically connectible to an associated one of the source lines by way of an associated one of the thin-film transistors,
    wherein each said thin-film transistor is a bottom-gate thin-film transistor, which includes a gate electrode that is electrically connected to an associated one of the gate lines, a gate insulating film that coats the gate electrode, a semiconductor layer that is provided over the gate electrode with the gate insulating film interposed, and source/drain electrodes that have been formed on the semiconductor layer,
    wherein the source lines are arranged under the gate lines with a first interlayer insulating film interposed and are electrically connected to the respective source electrodes of their associated thin-film transistors through contact holes that have been cut through the first interlayer insulating film;
    a first conductive member, which has been formed by patterning the same conductive film as the gate lines; and
    a second conductive member, which has been formed by patterning the same conductive film as the pixel electrodes, and
    wherein each of the source lines is electrically connected to the source electrodes through the first and second conductive members.

2. The active-matrix substrate of claim 1, wherein the first conductive member is in contact with the source line in the contact holes that have been cut through the first interlayer insulating film.

3. The active-matrix substrate of claim 2, further comprising a second interlayer insulating film, which is provided so as to cover the thin-film transistors,
    wherein the second conductive member is in contact with the first conductive member in contact holes that have been cut through the second interlayer insulating film.

4. The active-matrix substrate of claim 3, wherein the second conductive member is in contact with the source, electrodes of the thin-film transistors in the contact holes that have been cut through the second interlayer insulating film.

5. The active-matrix substrate of claim 1, wherein the first interlayer insulating film has a greater thickness and a lower dielectric constant than the gate insulating film.

6. The active-matrix substrate of claim 1, wherein the first interlayer insulating film has a thickness of 1.0 µm to 4.0 µm.

7. The active-matrix substrate of claim 1, wherein the first interlayer insulating film has a dielectric constant of 4.0 or less.

8. The active-matrix substrate of claim 1, wherein the first interlayer insulating film is made of an insulator including an organic ingredient.

9. The active-matrix substrate of claim 8, wherein the first interlayer insulating film is made of a spin-on-glass (SOG) material, of which the skeleton is an Si—O—C bond.

10. The active-matrix substrate of claim 8, wherein the first interlayer insulating film is made of a spin-on-glass (SOG) material, of which the skeleton is an Si—C bond.

11. The active-matrix substrate of claim 8, wherein the first interlayer insulating film is made of a spin-on-glass (SOG) material including a filler made of silica.

12. The active-matrix substrate of claim 1, wherein the semiconductor layer is made of amorphous silicon.

13. The active-matrix substrate of claim 1, comprising a plurality of pixel regions, which are arranged in matrix and in each of which an associated one of the pixel electrodes is provided.

14. The active-matrix substrate of claim 13, comprising: a display area, which is defined by the pixel regions; and a non-display area, which is located around the display area and in which a plurality of terminals are provided to receive signals for driving the pixel regions,
    wherein the first interlayer insulating film is substantially non-existent in the non-display area.

15. The active-matrix substrate of claim 1, further comprising a shield electrode, which is provided so as to extend substantially parallel to the source lines.

16. The active-matrix substrate of claim 15, wherein the shield electrode is electrically connected to an associated one of the gate lines.

17. The active-matrix substrate of claim 15, further comprising a plurality of storage capacitor lines, which are arranged on the base substrate,
    wherein the shield electrode is electrically connected to an associated one of the storage capacitor lines.

18. The active-matrix substrate of claim 15, wherein the shield electrode is arranged so as to overlap with the edge of an associated one of the pixel electrodes.

19. A display device comprising: the active-matrix substrate of claim 1; and a display medium layer arranged on the active-matrix substrate.

20. The display device of claim 19, further comprising a counter substrate, which faces the active-matrix substrate through the display medium layer, wherein the display medium layer is a liquid crystal layer.

* * * * *